(12) United States Patent
Choi et al.

(10) Patent No.: US 11,516,380 B2
(45) Date of Patent: Nov. 29, 2022

(54) METHOD OF CONTROLLING CAMERA DEVICE IN AN ELECTRONIC DEVICE IN VARIOUS INSTANCES AND ELECTRONIC DEVICE THEREOF

(71) Applicant: Samsung Electronics Co., Ltd., Gyeonggi-do (KR)

(72) Inventors: Bonghak Choi, Gyeonggi-do (KR); Jungyeob Oh, Gyeonggi-do (KR); Jongkee Lee, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/104,980

(22) Filed: Nov. 25, 2020

(65) Prior Publication Data

US 2021/0084216 A1 Mar. 18, 2021

Related U.S. Application Data

(63) Continuation of application No. 15/407,943, filed on Jan. 17, 2017, now abandoned.

(30) Foreign Application Priority Data

Jan. 15, 2016 (KR) ........................ 10-2016-0005293

(51) Int. Cl.
*H04N 5/232* (2006.01)
*G06F 1/16* (2006.01)
(Continued)

(52) U.S. Cl.
CPC ....... *H04N 5/23216* (2013.01); *G06F 1/1626* (2013.01); *G06F 1/1686* (2013.01);
(Continued)

(58) Field of Classification Search
CPC .............. G06F 3/0486; G06F 3/04883; G06F 3/04886; G06F 1/1626; G06F 1/1686;
(Continued)

(56) References Cited

U.S. PATENT DOCUMENTS

| 6,154,210 A | 11/2000 | Anderson |
| 2009/0295943 A1 | 12/2009 | Kim |

(Continued)

FOREIGN PATENT DOCUMENTS

| KR | 10-1375908 | 3/2014 |
| KR | 1020140089866 | 7/2014 |

OTHER PUBLICATIONS

Korean Office Action dated Apr. 26, 2022 issued in counterpart application No. 10-2016-0005293, 10 pages.
KR Notice of Patent Grant dated Aug. 2, 2022 issued in counterpart application No. 10-2016-0005293, 4 pages.

*Primary Examiner* — Antoinette T Spinks
(74) *Attorney, Agent, or Firm* — The Farrell Law Firm, P.C.

(57) ABSTRACT

An electronic device and a method for controlling a camera device in the electronic device are provided. The electronic device includes a display, a camera device disposed at a location overlapping a partial area of the display, and a processor that controls the camera device based on information input through an adjacent area of the partial area of the display or an adjacent area including the partial area of the display.

17 Claims, 40 Drawing Sheets

(51) Int. Cl.
*G06F 3/04886* (2022.01)
*H04N 5/247* (2006.01)
*G06F 3/04883* (2022.01)
*G06F 3/0486* (2013.01)

(52) U.S. Cl.
CPC ........ *G06F 3/0486* (2013.01); *G06F 3/04883* (2013.01); *G06F 3/04886* (2013.01); *H04N 5/23218* (2018.08); *H04N 5/232933* (2018.08); *H04N 5/232941* (2018.08); *H04N 5/247* (2013.01)

(58) Field of Classification Search
CPC ............... H04N 5/23216; H04N 5/232; H04N 5/23293; H04N 5/247
See application file for complete search history.

(56) References Cited

U.S. PATENT DOCUMENTS

| | | |
|---|---|---|
| 2011/0216049 A1 | 9/2011 | Jun |
| 2012/0011456 A1* | 1/2012 | Noda .................. H04N 21/414 715/847 |
| 2014/0016921 A1 | 1/2014 | Choi |
| 2014/0133715 A1* | 5/2014 | Ballard .............. G06K 9/00013 382/124 |
| 2014/0361986 A1 | 12/2014 | Won |
| 2015/0002735 A1* | 1/2015 | Moskovchenko ... G06K 9/4652 348/370 |
| 2015/0015763 A1 | 1/2015 | Lee et al. |
| 2015/0065046 A1 | 3/2015 | Wilfred |
| 2016/0154559 A1 | 6/2016 | Yu |
| 2016/0259543 A1 | 9/2016 | Ishihara |
| 2017/0126979 A1* | 5/2017 | Evans, V ............ H04M 1/0264 |

\* cited by examiner

METHOD OF CONTROLLING CAMERA DEVICE IN AN ELECTRONIC DEVICE IN VARIOUS INSTANCES AND ELECTRONIC DEVICE THEREOF

PRIORITY

This application is a Continuation Application of U.S. patent application Ser. No. 15/407,943, filed Jan. 17, 2017, which claims priority under 35 U.S.C. § 119(a) to Korean Patent Application Ser. No. 10-2016-0005293, which was filed in the Korean Intellectual Property Office on Jan. 15, 2016, the entire content of each of which is incorporated herein by reference.

BACKGROUND

1. Field of the Disclosure

The present disclosure relates generally to an apparatus and a method for controlling a camera device in an electronic device.

2. Description of the Related Art

With the development of information, communication, and semiconductor technologies, various types of electronic devices have developed into devices that provide various multimedia services. For example, portable electronic devices may provide various services such as broadcast services, wireless Internet services, camera services, and music playback services.

The electronic device may provide the camera services through a plurality of camera devices to meet various user demands. For example, the electronic device may acquire images or videos through a front camera device disposed on the front surface of the electronic device and a back camera device disposed on the back surface.

SUMMARY

The electronic device may provide the camera service to a user of the electronic device by executing a camera application to control the plurality of camera devices. However, the user of the electronic device may feel inconvenience due to multiple controls for execution of the camera application. For example, when the user of the electronic device uses the camera service through an electronic device in which a message application is being executed, the user may feel inconvenience in executing the camera application through a second control after making the electronic device enter a standby mode through a first control. As another example, when the user of the electronic device uses the camera service through a locked electronic device, the user may feel inconvenience in executing the camera application through a second control after unlocking the electronic device through a first control.

The present disclosure has been made to address at least the above-mentioned problems and/or disadvantages and to provide at least the advantages described below.

Accordingly, an aspect of the present disclosure is to provide an electronic device and a method for easily controlling a camera device in an electronic device.

Accordingly, another aspect of the present disclosure is to provide an electronic device including a camera device disposed at a location overlapping at least a partial area of a display and a method for controlling the camera device based on an adjacent area including a placement area of the camera device or an adjacent area close to the placement area of the camera device, so that a user of the electronic device can easily drive and control a camera application.

Accordingly, another aspect of the present disclosure is to provide an electronic device including a camera device disposed at a location overlapping at least a partial area of a display and a method for displaying control information related to a camera device in an adjacent area including a placement area of the camera device or an adjacent area close to the placement area of the camera device, so that a user of the electronic device can easily detect an operational state of the camera device and a photo can be taken by inducing a user's eyes in a direction of the camera lens.

In accordance with an aspect of the present disclosure, an electronic device is provided. The electronic device includes a display, a camera device disposed at a location overlapping a partial area of the display, and at least one processor configured to control the camera device based on information input through an adjacent area of the partial area of the display or an adjacent area including the partial area of the display.

In accordance with another aspect of the present disclosure, a method of operating an electronic device including a camera device disposed at a location overlapping a partial area of a display is provided. The method includes detecting input information through an adjacent area of the partial area of the display or an adjacent area including the partial area of the display, and controlling the camera device based on the input information.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1A:
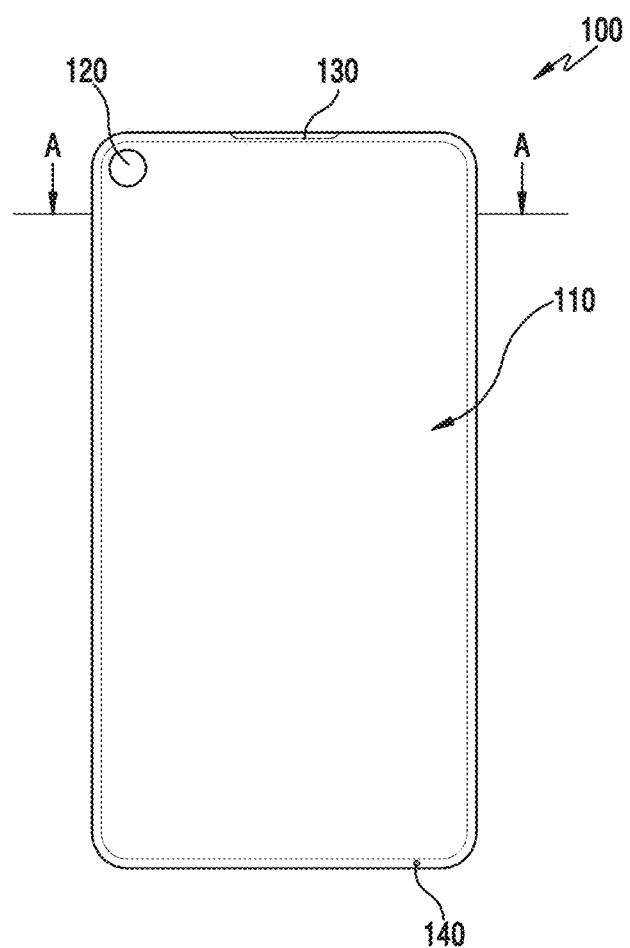
FIGS. 1A and 1B illustrate a configuration of an electronic device, according to an embodiment of the present disclosure.

Hereinafter, various embodiments of the present disclosure will be described with reference to the accompanying drawings. In the following description, specific details, such as detailed configuration and components, are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness. In describing the drawings, similar reference numerals may be used to designate similar elements.

The terms "have" or "include" used in describing the various embodiments of the present disclosure indicate the presence of disclosed corresponding functions, operations, elements, features, numbers, steps, and the like, and do not limit the addition of one or more functions, operations, elements, features, numbers, steps and the like. The terms "A or B", at least one of A or/and B" or "one or more of A or/and B" used in the various embodiments of the present disclosure include any and all combinations of words enumerated with it. For example, "A or B", "at least one of A and B" or "at least one of A or B" means (1) including A, (2) including B, or (3) including both A and B.

Although terms such as "first" and "second" used herein may modify various elements of various embodiments, these terms do not limit the corresponding elements. For example, these terms do not limit an order and/or importance of the corresponding elements. These terms may be used for the purpose of distinguishing one element from another element. For example, a first user device and a second user device both indicate user devices and may indicate different user devices. For example, a first element may be referred to as a second element without departing from the scope of the present disclosure, and similarly, a second element may be referred to as a first element.

It should be understood that when an element (e.g., a first element) is "connected" or "coupled" another element (e.g., a second element), the first element may be directly connected or coupled to the second element, and there may be an intervening element (e.g., a third element) between the first element and second element. To the contrary, it will be understood that when an element (e.g., a first element) is "directly connected" or "directly coupled" to another element (e.g., second element), there is no intervening element (e.g., a third element) between the first element and the second element.

The expressions "configured to" or "set to" used in describing various embodiments of the present disclosure may be used interchangeably with "suitable for", "having the capacity to", "designed to", "adapted to", "made to", or "capable of" according to the situation. The terms "configured to" or "set to" do not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a central processing unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure may include at least one of a smartphone, a tablet personal computer (PC), a mobile phone, a video phone, an electronic book (e-book) reader, a laptop PC, a netbook computer, a workstation, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to another embodiment, the electronic device may include at least one of various medical devices (e.g., various portable medical measuring devices (a blood glucose monitoring device, a heart rate monitoring device, a blood pressure measuring device, a body temperature measuring device, etc.)), a navigation device, a global positioning system (GPS) receiver, an event data recorder (EDR), a flight data recorder (FDR) a vehicle infotainment device, an electronic device for a ship (e.g., a navigation device, and a gyro-compass), an avionics device, a security device, or Internet of Things (IoT) device (e.g., a light bulb, various sensors, an electric or gas meter, a sprinkler device, a fire alarm, a thermostat, a streetlamp, a toaster, a sporting goods, a hot water tank, a heater, a boiler, etc.).

The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

Figure 1B:
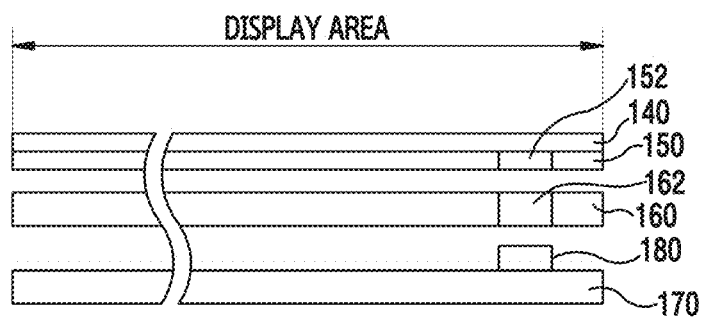

FIGS. 1A and 1B illustrate a configuration of an electronic device, according to an embodiment of the present disclosure.

Referring to FIGS. 1A and 1B, an electronic device 100 is provided. The electronic device 100 may be configured as one body. For example, the electronic device 100 may be an electronic device for communication including a speaker device 130 and a microphone device 140 for a voice call.

The electronic device 100 may have a front surface configured by a touch screen 110. For example, a camera device 120 may be disposed on at least some areas of the touch screen 110.

The speaker device 130 may be disposed on at least one surface adjacent to the touch screen 110 (for example, an upper side surface, lower side surface, left side surface, and tight side surface). For example, the speaker device 130 may be disposed on the upper side surface adjacent to the touch screen 110 close to the user's ear for a voice call.

Control buttons (for example, a home button and a back button) for controlling the electronic device 100 may be displayed in a lower area of the touch screen 110.

The touch screen 110 of the electronic device 100 may include a front window 140, a touch panel 150, a display module 160, and a printed circuit board (PCB) 170, as illustrated in FIG. 1B. For example, the camera device (for example, a front camera device) 180 of the electronic device 100 may be mounted on the PCB. For example, the front window 140 may be a transparent material window film that forms an external surface of the touch screen 110. For example, the PCB 170 may use a flexible PCB (FPCB), which is an electronic component made by forming a conductive circuit having good electrical conductivity (e.g., cooper) on an insulator.

According to an embodiment, the camera device 180 may be disposed at a position overlapping at least some areas 152 of the touch panel 150. For example, at least some areas 152 of the touch panel 150 on which the camera device 180 is disposed may be perforated. In this case, the touch screen 110 may have a limited touch recognition function in the area 152 on which the camera device 180 is disposed. Alternatively, at least some areas 152 of the touch panel 150 on which the camera device 180 is disposed are not perforated, and a touch pattern for touch recognition may be omitted in the corresponding areas 152. In this case, the touch screen 110 may have a limited touch recognition function in the area 152 on which the camera device 180 is disposed. Alternatively, at least some areas 152 of the touch panel 150 on which the camera device 180 is disposed are not perforated, and the touch pattern for touch recognition may be set in the corresponding areas 152. In this case, the touch screen 110 may detect a touch input through the areas 152 on which the camera device 180 is disposed. For example, the touch pattern may include an electrode for the touch recognition.

According to an embodiment, the camera device 180 may be disposed at a position overlapping some areas 162 of the display module 160. For example, at least some areas 162 of the display module 160 on which the camera device 180 is disposed may be perforated. In this case, the touch screen 110 may have a limited display function on the areas 162 in which the camera device 180 is disposed. Alternatively, at least some areas 162 of the display module 160 on which the camera device 180 is disposed are not perforated, and a display component may not be disposed in the corresponding areas 162. In this case, the touch screen 110 may have a limited display function on the areas 162 in which the camera device 180 is disposed. Alternatively, at least some areas 162 of the display module 160 on which the camera device 180 is disposed may not be perforated, and a display component may be disposed. In this case, the touch screen 110 may display information through the areas 162 in which the camera device 180 is disposed.

The electronic device 100 may form at least one hole in at least some areas (upper end) of the touch screen 110 and place the speaker device 130 for a voice call service in the at least one hole.

Figure 2:
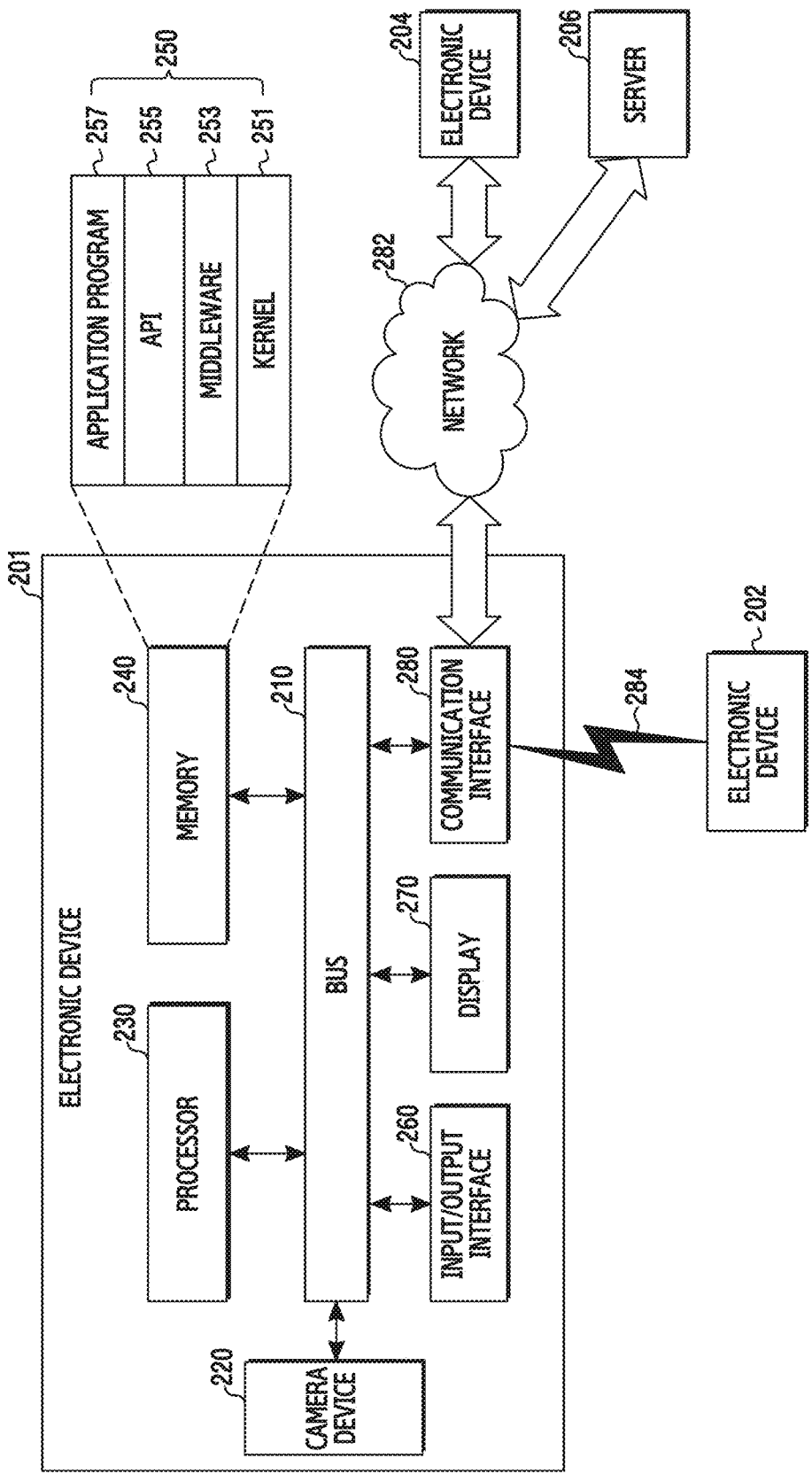
FIG. 2 is a block diagram of an electronic device in a network environment, according to an embodiment of the present disclosure.

FIG. 2 is a block diagram of an electronic device in a network environment, according to an embodiment of the present disclosure.

Referring to FIG. 2, an electronic device 201 is provided. The electronic device 201 may include a bus 210, a camera device 220, a processor 230 (e.g., including processing circuitry), a memory 240, an input/output interface 260 (e.g., including input/output circuitry), a display 270 (e.g., including display circuitry), and a communication interface 280 (e.g., including communication circuitry). In some embodiments, the electronic device 201 may omit at least one of the elements, or may further include other elements.

The bus 210 is a circuit that interconnects the elements 220 to 280 and transfers communication (for example, control messages and/or data) between the elements.

The camera device 220 may collect image information of a subject. For example, the camera device 220 may include a plurality of camera devices included in the electronic device 201. For example, the camera device 220 may include a first camera device (for example, front camera device) for performing photography in a selfie mode and a second camera device (for example, back camera device) for photographing a subject located in front of the user. For example, the camera device 220 may be disposed to be included in at least some areas of the display 270. For example, an image senor of the first camera device may be disposed in at least some areas of the display 270. For example, the image sensor may use a charge-coupled device (CCD) image sensor or a complementary metal-oxide semiconductor (CMOS) image sensor.

The processor 230 may include one or more of a central processing unit (CPU), an application processor (AP), and a communication processor (CP). For example, the processor 230 may execute calculations or data processing about controls and/or communication of at least one other element of the electronic device 201. The processor 230 may perform various functions of the electronic device 201. Accordingly, the processor 230 may control the elements of the electronic device 201.

The processor 230 may control the camera device 220 based on touch information of a preset camera control area to control the camera device 220. For example, when some areas of the touch panel are perforated to place the camera device 220, the processor 230 may set at least some areas adjacent to the placement areas of the camera device 220 on the touch panel as camera control areas. For example, when some areas of the touch panel corresponding to the placement areas of the camera device 220 are not perforated and a touch pattern is omitted in the corresponding areas, the processor 230 may set at least some areas adjacent to the placement areas of the camera device 220 on the touch panel as camera control areas. Alternatively, when some areas of the touch panel corresponding to the placement areas of the camera device 220 are not perforated and the touch pattern is set in the corresponding areas, the processor 230 may set the placement areas of the camera device 220 on the touch panel and at least some areas adjacent to the placement areas of the camera device 220 as camera control areas.

The processor 230 may drive the camera device 220 based on a touch and a drag input in the camera control area. For example, when the touch input in the camera control area is detected, the processor 230 may control the display 270 to display camera activation information in a display area corresponding to the camera control area. For example, when the display 270 is deactivated, the processor 230 may maintain the touch recognition function of the camera control area in an active state. Accordingly, the processor 230 may detect the touch input in the camera control area in an inactive state of the display 270. When the drag input of the camera activation information is detected, the processor 230 may execute a camera application to start a front camera mode. For example, the processor 230 may set a camera display area to display a service screen of the camera application based on a distance of the drag input. The processor 230 may control the display 270 to display the service screen of the camera application (for example, a preview image acquired through the camera device 220) in the camera display area.

The processor 230 may drive the camera device 220 based on a touch and a touch maintaining time in the camera control area. For example, when the touch input in the camera control area is detected, the processor 230 may control the display 270 to display camera activation information in the display area corresponding to the placement area of the camera device 220. When the touch maintaining time of the camera activation information exceeds a reference time, the processor 230 may execute the camera application to start the front camera mode, for example. In this case, the processor 230 may control the display 270 to display the preview image acquired through the front camera device.

The processor 230 may control the camera application to be linked with another application. For example, when the touch and the drag input in the camera control area are detected in a state where a service screen of another application is displayed, the processor 230 may display the service screen of the camera application in at least some areas of the display 270 based on a distance of the drag input. That is, the processor 230 may divide the display 270 into a first area and a second area based on the distance of the drag input. The processor 230 may control the display 270 to display a service screen of another application in the first area of the display 270 and to display a service screen of the camera application in the second area. When an image is captured (or acquired) through the camera application, the processor 230 may determine whether the camera application can be linked with the other application. When the camera application can be linked with the other application, the processor 230 may set the image captured through the camera application as contents to be controlled in the other application. When the camera application cannot be linked with the other application, the processor 230 may store the image captured through the camera application in the memory 240. For example, the processor 230 may end the camera application when the image is captured.

The processor 230 may set a tinier of the camera device 220 to capture an image based on touch information (for example, at least one of the touch input and the drag input) in the camera control area. For example, when the drag input in the camera control area is detected while the camera application is executed (for example, in the front camera mode), the processor 230 may set the timer of the camera device 220 to correspond to a drag distance. That is, the processor 230 may set a time of the timer in proportion to the drag distance. The processor 230 may control the display 270 to display timer information based on the placement area of the camera device 220. The processor 230 may continuously reduce a size of the timer information displayed on the display 270 in accordance with the elapsing of the time of the timer. When the display of the timer information is removed from the display 270, the processor 230 may capture an image. For example, when the touch input in the camera control area is detected while the camera application is executed (for example, in the front camera mode), the processor 230 may set the timer of the camera device 220 based on a touch position. That is, the processor 230 may set the time of the timer in proportion to a distance between the placement area of the camera device 220 and the touch position. For example, the timer of the camera device 220 may include a photographing timer of the camera device 220 to capture an image.

The processor 230 may change a color of the display 270 to secure an amount of light to capture the image. For example, when the image is captured through the front camera device, the processor 230 may change the color of the display 270 into a bright color (for example, white) based on the placement area of the camera device 220 and provide a flash effect. For example, the processor 230 may apply various image effects by changing the color of the display 270 in accordance with a user input.

The processor 230 may control the display 270 to display additional information for a camera service through the camera control area. For example, when the image is captured through the front camera device, the processor 230 may control the display 270 to display a graphic effect (for example, wavelength image) based on the placement area of the camera device 220 to induce a user's eyes to the front camera device. For example, when video is photographed through the back camera device, the processor 230 may control the display 270 to display audio input information based on the placement area of the camera device 220. For example, the processor 230 may control a size of audio input information to correspond to a size of an audio signal collected through the microphone device 140 while the video is photographed.

The processor 230 may execute the camera application based on touch information of an application icon. For example, when at least one of a touch input and a drag input for the application icon is detected, the processor 230 may identify whether the application icon enters the camera control area. When the application icon enters the camera control area, the processor 230 may identify whether an application corresponding to the application icon is linked with the camera application. When the application corresponding to the application icon is linked with the camera application, the processor 230 may execute a camera function (for example, front camera mode) of the application corresponding to the application icon. For example, when the touch input for the application icon is released within the camera control area, the processor 230 may determine that the application icon enters the camera control area.

The processor 230 may execute a multi-camera mode based on touch information of the camera control area. For example, the processor 230 may provide a camera service of one of a plurality of camera devices. When a tap input in the camera control area is detected while the camera service is provided, the processor 230 may switch to the multi-camera mode in which the plurality of camera devices are simultaneously activated. For example, when a tap input in the camera control area is detected while the front camera mode is executed, the processor 230 may additionally activate the back camera device and execute the multi-camera mode. In this case, the display 270 may overlap the display of preview images acquired through the front camera device and the back camera device or display the preview images in different areas. In addition, when a tap input in the camera control area is detected while the multi-camera mode is executed, the processor 230 may switch positions of the preview images. The processor 230 may control sizes of the preview images based on input information detected through the input/output interface 260.

The processor 230 may provide an automatic photographing service based on at least one of a location and an angle of the electronic device 201 in the front camera mode. For example, when the automatic photographing mode is set, the processor 230 may display a camera image corresponding to the location and the angle of the electronic device 201 to be adjacent to the placement area of the camera device 220. That is, the processor 230 may display the camera image corresponding to the location and the angle of the electronic device 201 to allow the user to control the location and the angle of the electronic device 201 to match photographing information. When the location and the angle of the electronic device 201 match the photographing information, the processor 230 may automatically capture the image. For example, the photographing information may be set by a user input or may include at least one of the location and the angle of the electronic device 201 that match the image acquired through the front camera mode.

The processor 230 may set the camera application to control the camera device 220 based on touch information of the camera control area. For example, when a drag input in a first direction (for example, a horizontal direction) in the camera control area is detected, the processor 230 may control the display 270 to display a camera application list installed in the electronic device 201. The processor 230 may select one first camera application based on input information detected through the input/output interface 260. The processor 230 may control the camera device 220 by executing the first camera application. That is, the processor 230 may drive the camera device 220 based on camera setting information set to the first camera application. In addition, the processor 230 may set the first camera application as a basic camera application. Accordingly, when the camera device 220 is driven based on touch information of the camera control area, the processor 230 may execute the first camera application. For example, the camera setting information may include at least one of a filter for photographing, a photographing mode, and a photographing setting value (for example, aperture, shutter speed, image size, and the like).

The processor 230 may control the camera device 220 in accordance with the camera setting information of the image. For example, the processor 230 may control the display 270 to display a list of images stored in the memory 240. For example, when the image is acquired, the processor 230 may control the display 270 to display corresponding filter information in the image to which a filter is applied. When a touch and a drag input for a first image is detected in the image list, the processor 230 may identify whether the first image enters the camera control area. When the first image enters the camera control area, the processor 230 may drive the camera device 220 in accordance with camera setting information of the first image. For example, when a touch input for the first image is released within the camera control area, the processor 230 may determine that the first image enters the camera control area.

The processor 230 may capture an image based on touch information of the camera control area. For example, when a double tap input in the camera control area is detected, the processor 230 may capture an image through the camera device 220 without executing the camera application.

The processor 230 may photograph video based on touch information of the camera control area. For example, when a touch maintaining time of the camera control area exceeds a reference time, the processor 230 may photograph video through the camera device 220 without executing the camera application. When the touch input in the camera control area is released, the processor 230 may end the photographing of the video. For example; when the touch maintaining time in the camera control area exceeds the reference time, the processor 230 may output notification information to allow the user to recognize the start of the video photographing. Here, the notification information may include at least one of a notification sound, a notification message, and a vibration.

When driving of the camera device 220 is limited, the processor 230 may display driving limit information to be adjacent to the placement area of the camera device 220. For example, when the driving of the camera device 220 is limited by an application being executed in the electronic device 201, the processor 230 may display driving limit information to be adjacent to the placement area of the camera device 220. For example, when the driving of the camera device 220 is limited based on a position of the electronic device 201, the driving limit information may be displayed to be adjacent to the placement area of the camera device 220. In addition, when a touch input in the camera control area is detected in a state where the driving of the camera device 220 is limited, the processor 230 may execute a camera setting menu.

The processor 230 may display notification information of a communication service using an image to be adjacent to the placement area of the camera device 220. For example, when a video call signal is received, the processor 230 may display video call notification information to be adjacent to the placement area of the camera device 220. The processor 230 may determine whether to accept the video call based on touch information of an area where the video call notification information is displayed.

When a human body recognition service using the camera device 220 is provided, the processor 230 may display human body recognition information (for example, face recognition) to be adjacent to the placement area of the camera device 220. For example, when iris recognition is performed through the camera device 220, the processor 230 may display time information required for the iris recognition based on the placement area of the camera device 220 to allow the user to recognize the time information corresponding to a time during which the user should look at the camera device 220 for the iris recognition. The processor 230 may further display progress time information of the iris recognition. For example, when the time information required for the iris recognition matches the progress time information of the iris recognition, the processor 230 may complete the iris recognition.

The processor 230 may display pollution level information of the camera device 220 to be adjacent to the placement area of the camera device 220. For example, the processor 230 may estimate a pollution level of the image sensor of the camera device 220 by detecting the definition of the image acquired through the camera device 220. The processor 230 may display the pollution level information of the image sensor of the camera device 220 to be adjacent to the placement area of the camera device 220. For example, when the pollution level of the image sensor of the camera device 220 exceeds a reference value, the processor 230 may display pollution level information to be adjacent to the placement area of the camera device 220.

When a user's hovering input is detected through the camera control area, the processor 230 may display a guide image to induce a touch of another area adjacent to the placement area of the camera device 220.

The memory 240 may include a volatile memory and/or a non-volatile memory. For example, the memory 240 may store instructions or data related to at least one other element of the electronic device 201. The memory 240 may store software and/or a program 250. For example, the program 250 may include a kernel 251, middleware 253, an application programming interface (API) 255, and an application program 257. At least some of the kernel 251 the middleware 253, and the API 255 may be referred to as an operating system (OS).

The input/output interface 260 may function as an interface that may transfer instructions or data input from a user or another external device to the other elements of the electronic device 201. Furthermore, the input/output interface 260 may output instructions or data, which are received from the other elements of the electronic device 201, to the user or the external device. For example, the input/output interface 260 may include a touch panel that detects a touch input or a hovering input using an electronic pen or a user's body part. For example, the input/output interface 260 may receive a gesture or a proximity input using an electronic pen or a user's body part.

The display 270 may display various types of contents (for example, text, images, videos, icons, symbols, or the like) to a user. For example, at least some areas (for example, upper areas) of the display 270 may be perforated for placement of the camera device 220. Accordingly, the display 270 may limit the display function in the placement area of the camera device 220. According to an embodiment, the display 270 may be implemented by a touch screen coupled with the touch panel of the input/output interface 260.

The communication interface 280 may establish communication between the electronic device 201 and an external device. For example, the communication interface 280 may communicate with a first external electronic device 202 through short-range communication 284 or wired communication. The communication interface 280 may be connected to a network 282 through wireless or wired communication to communicate with a second external electronic device 204 or a server 206.

According to an embodiment, the network 282 may include at least one of a communication network, a computer network (for example, a LAN or a WAN), the Internet, and a telephone network.

Figure 3:
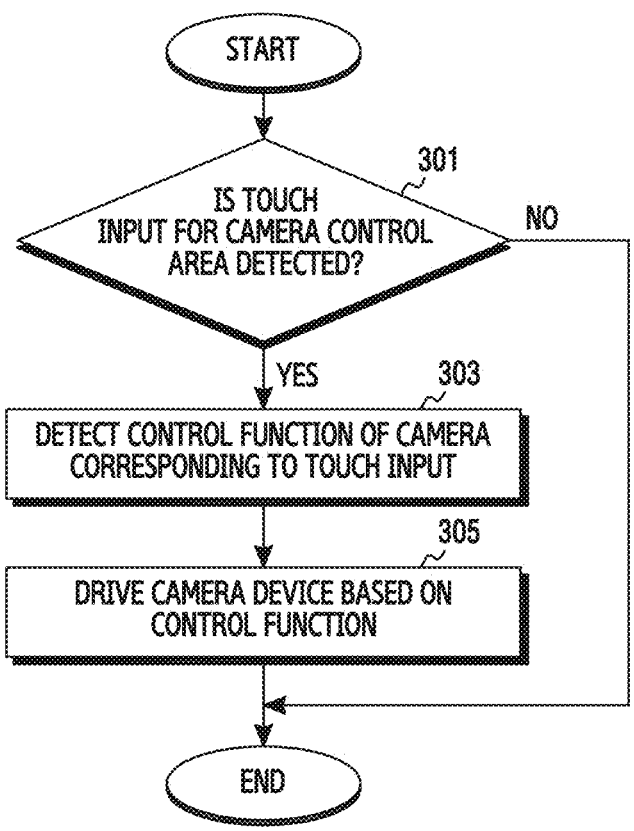
FIG. 3 is a flowchart of a process for controlling a camera device in an electronic device, according to an embodiment of the present disclosure.

FIG. 3 is a flowchart of a process for controlling a camera device in an electronic device, according to an embodiment of the present disclosure. In the following description, the electronic device may include the electronic device 201 or at least a part (for example, processor 230) of the electronic device 201.

Referring to FIG. 3, the electronic device 201 identifies whether a touch input for the camera control area related to the placement area of the camera device 220 is detected on the touch screen in operation 301. For example, when some areas of the touch panel are perforated for placement of the camera device 220, the camera control area may be disposed on at least some areas adjacent to the placement area of the camera device 220 on the touch screen. For example, when some areas of the touch panel corresponding to the placement area of the camera device 220 are not perforated and a touch pattern is omitted in the areas, the camera control area may be disposed on at least some areas adjacent to the placement area of the camera device 220 on the touch screen. For example, when some areas of the touch panel corresponding to the placement area of the camera device 220 are not perforated and the touch pattern is set in the areas, the camera control area may be disposed on the placement area of the camera device 220 and at least some areas adjacent to the placement area of the camera device 220 on the touch screen.

When the touch input for the camera control area is detected, the electronic device 201 detects a control function of the camera device 220 corresponding to the touch input in operation 303. For example, the processor 230 detects the control function of the camera device 220 based on at least one of the number of touches in the camera control area, a drag distance (i.e., touch motion distance), a drag direction (i.e., touch motion direction), and a touch maintaining time. For example, the control function of the camera device 220 may include at least one of driving of the camera device 220, selection of an application for driving the camera device 220, camera setting information, image capturing, video photographing, tinier setting, and camera mode switching.

The electronic device 201 drives the camera device 220 based on the control function of the camera device 220 corresponding to the touch input in the camera control area in operation 305. For example, the processor 230 controls the camera device 220 by executing the camera application in accordance with the control function of the camera device 220.

Figure 4:
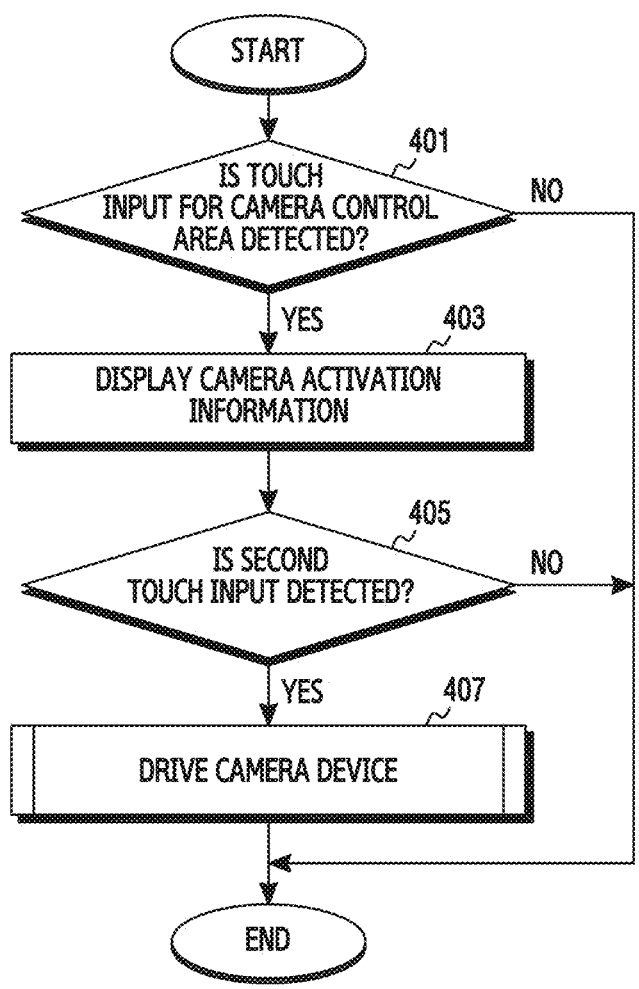
FIG. 4 is a flowchart of a process for controlling a camera device in an electronic device when a screen of the electronic device is turned off, according to an embodiment of the present disclosure.

FIG. 4 is a flowchart of a process for controlling a camera device in an electronic device when a screen of the electronic device is turned off, according to an embodiment of the present disclosure. FIGS. 6A to 6D illustrate a screen configuration for controlling a camera device in an electronic device when a screen of the electronic device is turned off, according to an embodiment of the present disclosure. In the following description, the electronic device may include the electronic device 201 or at least a part (for example, processor 230) of the electronic device 201.

Referring to FIG. 4, an operation for controlling the camera device 220 of electronic device 201 based on the screen configuration shown in FIGS. 6A to 6D will be described. Referring to FIG. 4, the electronic device 201 determines whether a first touch input is detected through a camera control area set based on a placement area of the camera device 220 on the touch screen in operation 401. For example, referring to FIG. 6A, when the display 270 is deactivated, the processor 230 maintains a touch recognition function of the camera control area in an active state. The processor 230 determines whether a first type touch input is detected through the camera control area. For example, the first type touch input may correspond to the type of touch in which the user rubs the camera control area and include a touch input having a continuously changing drag direction. For example, when the display 270 is activated, the processor 230 determines whether the first type touch input is detected through the camera control area. For example, the touch recognition function of the camera control area may be activated or deactivated based on the type of an application driven in the electronic device 201.

When a first touch input is not detected through the camera control area, the electronic device 201 terminates the operation for controlling the driving of the camera device 220.

Figure 6D:
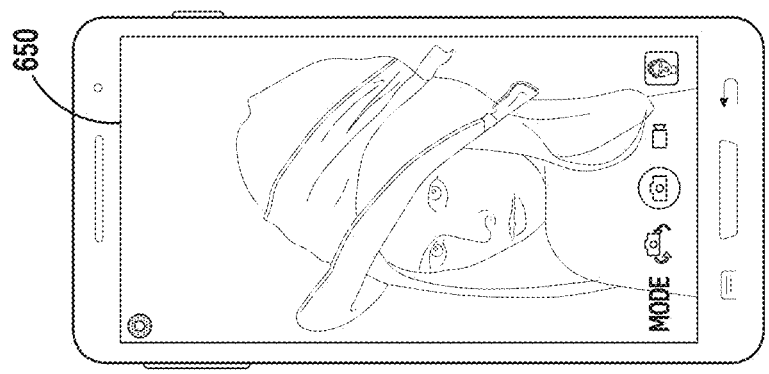
FIGS. 6A to 6D illustrate a screen configuration for controlling a camera device in an electronic device when a screen of the electronic device is turned off, according to an embodiment of the present disclosure.
Figure 6C:
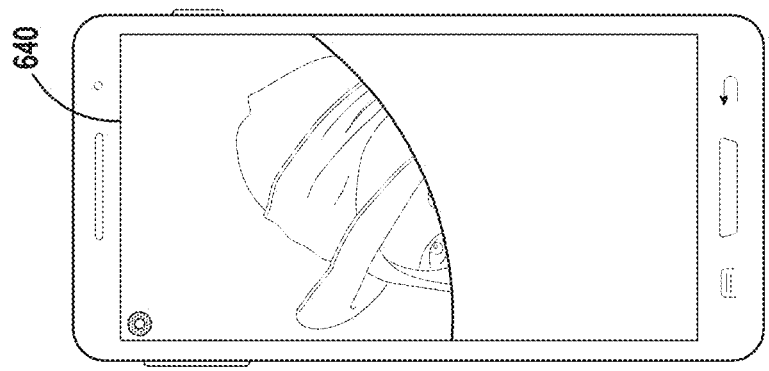
Figure 6B:
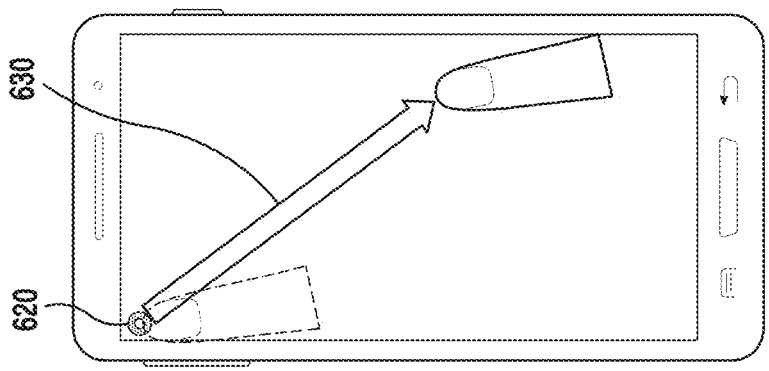

When the first touch input is detected through the camera control area, the electronic device 201 displays camera activation information in a display area corresponding to the camera control area in operation 403. For example, when the first type touch input is detected through the camera control area as indicated by reference numeral 610 in FIG. 6A, the processor 230 may display camera activation information 620 based on the placement area of the camera device 220, as illustrated in FIG. 6B.

The electronic device 201 determines whether a second touch input for the camera activation information is detected in operation 405. For example, the processor 230 determines whether a drag input 630 for the camera activation information 620 is detected within a reference time from a time point when the camera activation information 620 is displayed, as illustrated in FIG. 6B.

When the second touch input is not detected before the reference time passes from the time point when the camera activation information is displayed, the electronic device 201 may determine to not drive the camera. Accordingly, the electronic device 201 may terminate the operation for controlling driving of the camera device 220.

When the second touch input for the camera activation information is detected, the electronic device 201 drives the camera device 220 in operation 407. For example, when a drag input for the camera activation information 620 is detected as indicated by reference numeral 630, the processor 230 may display at least some of the service screen of the camera application in accordance with a distance of the drag input, as illustrated in FIG. 6C. When the drag distance exceeds a reference distance, the processor 230 may display the service screen of the camera application on the display 270 as indicated by reference numeral 650 in FIG. 6D. For example, the processor 230 may display a preview image acquired through the front camera device 220 on the display 270 by executing the camera application. For example, when the drag input for the camera activation information 620 is detected as indicated by reference numeral 630, the processor 230 may display the service screen (for example, a preview image) of the camera application in at least some areas of the display 270 in accordance with the drag input.

Figure 6A:
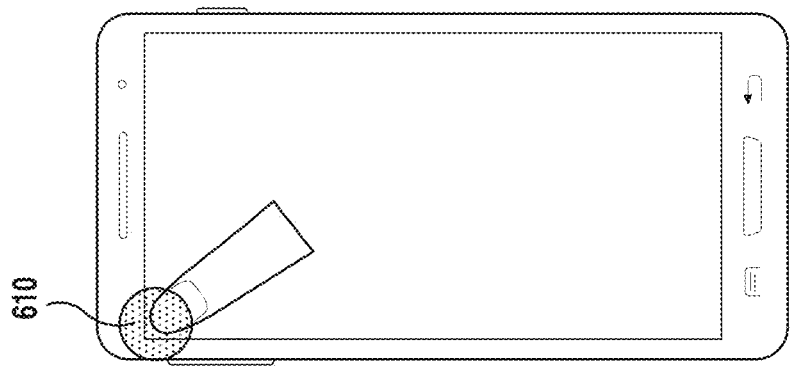

When the touch input for the drag is released before the drag distance exceeds the reference distance, the electronic device 201 may determine to not drive the camera device 220. Accordingly, the electronic device 201 may terminate the service screen of the camera application, as illustrated in FIG. 6A.

Figure 5:
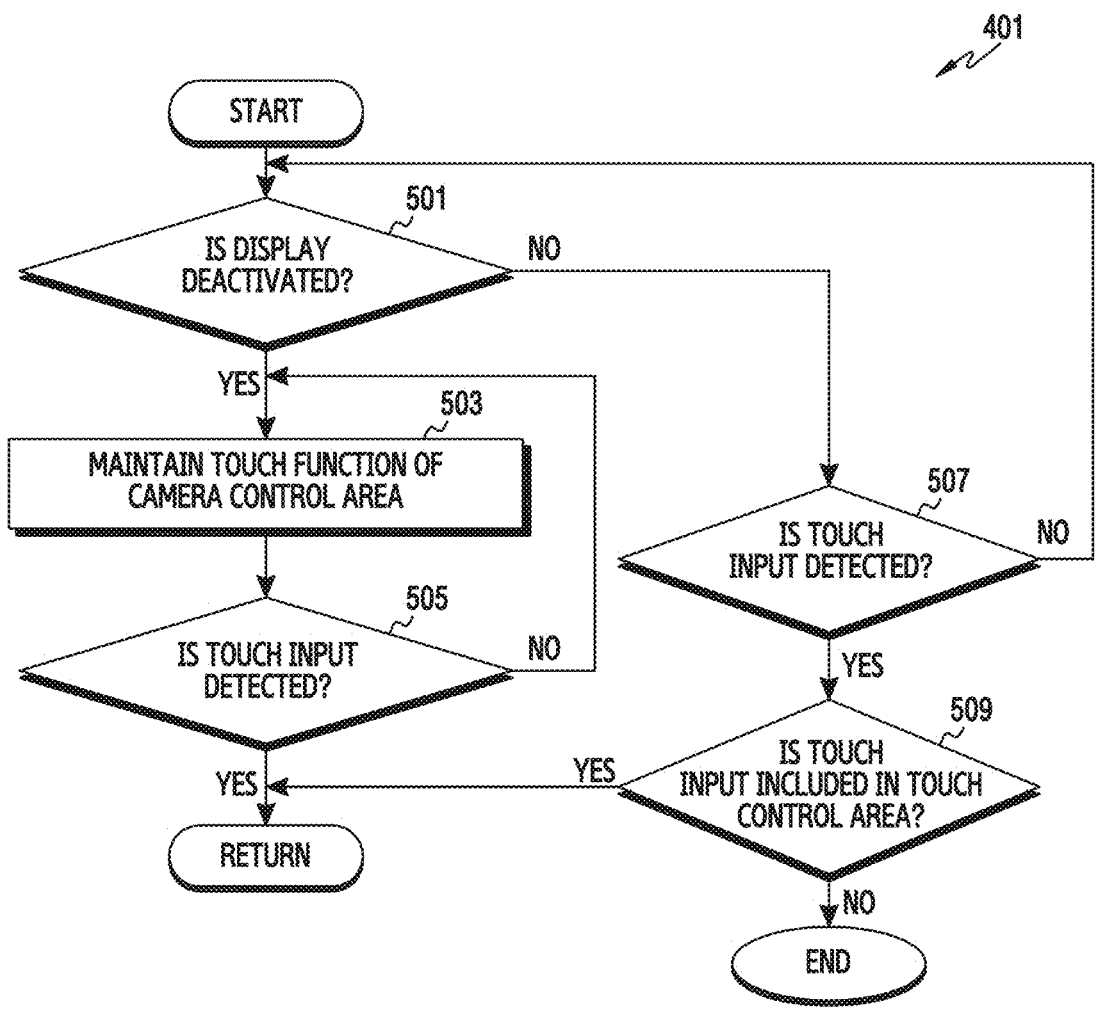
FIG. 5 is a flowchart of a process for detecting touch information of a camera control area in an electronic device, according to an embodiment of the present disclosure.

FIG. 5 is a flowchart of a process for detecting touch information of a camera control area in an electronic device, according to an embodiment of the present disclosure. In the following description, the electronic device may include the electronic device 201 or at least a part (for example, processor 230) of the electronic device 201.

Referring to FIG. 5, the operation for detecting a first touch input through the camera control area in operation 401 of FIG. 4 will be described. The electronic device 201 determines whether the display 270 is deactivated in operation 501. For example, the processor 230 determines whether an operation state of the display 270 switches to an inactive state since the electronic device 201 operates in a low power mode.

When the display 270 is deactivated, the electronic device 201 maintains the touch recognition function of the camera control area in an active state in operation 503. For example, when the display 270 is deactivated as indicated by reference numeral 600 in FIG. 6A, the processor 230 maintains a touch recognition function of the camera control area in an active state.

In operation 505, the electronic device 201 determines whether a touch input is detected through the camera control area. For example, the processor 230 determines whether a touch input of the type in which the user rubs the touch screen is detected through the camera control area having the activated touch recognition function as illustrated in FIG. 6A.

When the touch input is not detected through the camera control area, the electronic device 201 maintains the touch recognition function of the camera control area in the active state in operation 503.

When the display 270 is activated, the electronic device 201 determines whether the touch input is detected in operation 507. For example, when the display 270 is in the active state, the processor 230 maintains the touch recognition function of the touch panel corresponding to the display 270 in the active state. Accordingly, the processor 230 determines whether the touch input is detected through the touch panel in the active state.

When the touch input is not detected through the display in the active state, the electronic device 201 determines whether the display 270 is deactivated again in operation 501.

When the touch input is detected through the display 270 in the active state, the electronic device 201 determines whether the touch input is detected through the camera control area in operation 509. For example, the processor 230 determines whether a touch coordinate of the touch input is included in the camera control area.

Figure 7:
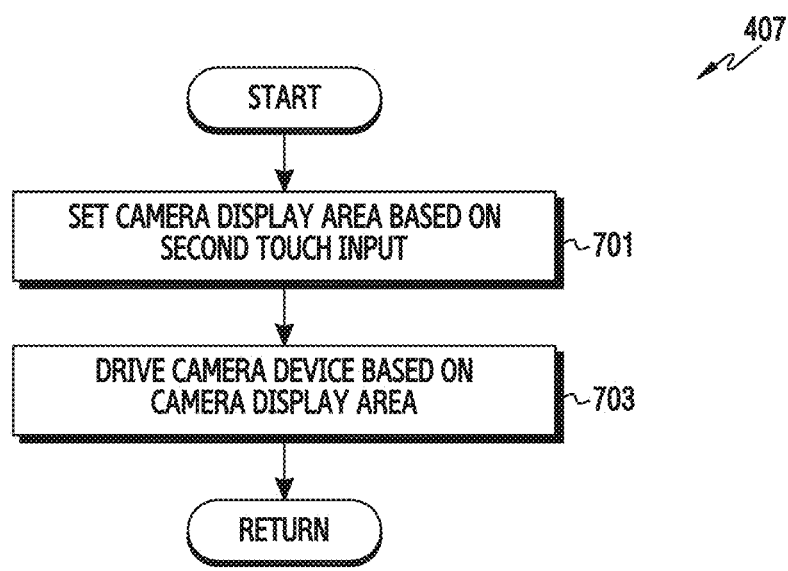
FIG. 7 is a flowchart of a process for configuring a camera display area in an electronic device based on touch information of a camera control area, according to an embodiment of the present disclosure.

FIG. 7 is a flowchart of a process for configuring a camera display area in an electronic device based on touch information of a camera control area, according to an embodiment of the present disclosure. In the following description, the electronic device may include the electronic device 201 or at least a part (for example, processor 230) of the electronic device 201.

Referring to FIG. 7, an operation for driving the camera device in operation 407 of FIG. 4 will be described. When the touch input for driving the camera device is detected through the camera control area (i.e., operation 405 of FIG. 4), the electronic device 201 sets the camera display area based on a second touch input in operation 701. For example, when the drag input for the camera activation information 620 is detected, as illustrated in FIG. 6B, the processor 230 sets at least some areas of the display 270 as the camera display area for displaying the service screen of the camera application in accordance with a drag distance. For example, when the drag distance for the camera activation information 620 exceeds a reference distance, the processor 230 sets the entire area of the display 270 as the camera display area.

The electronic device 201 may drive the camera device 220 based on the camera display area in operation 703. For example, the processor 230 may display a preview image acquired through the front camera device in the camera display area of the display 270 by executing the camera application.

Figure 8:
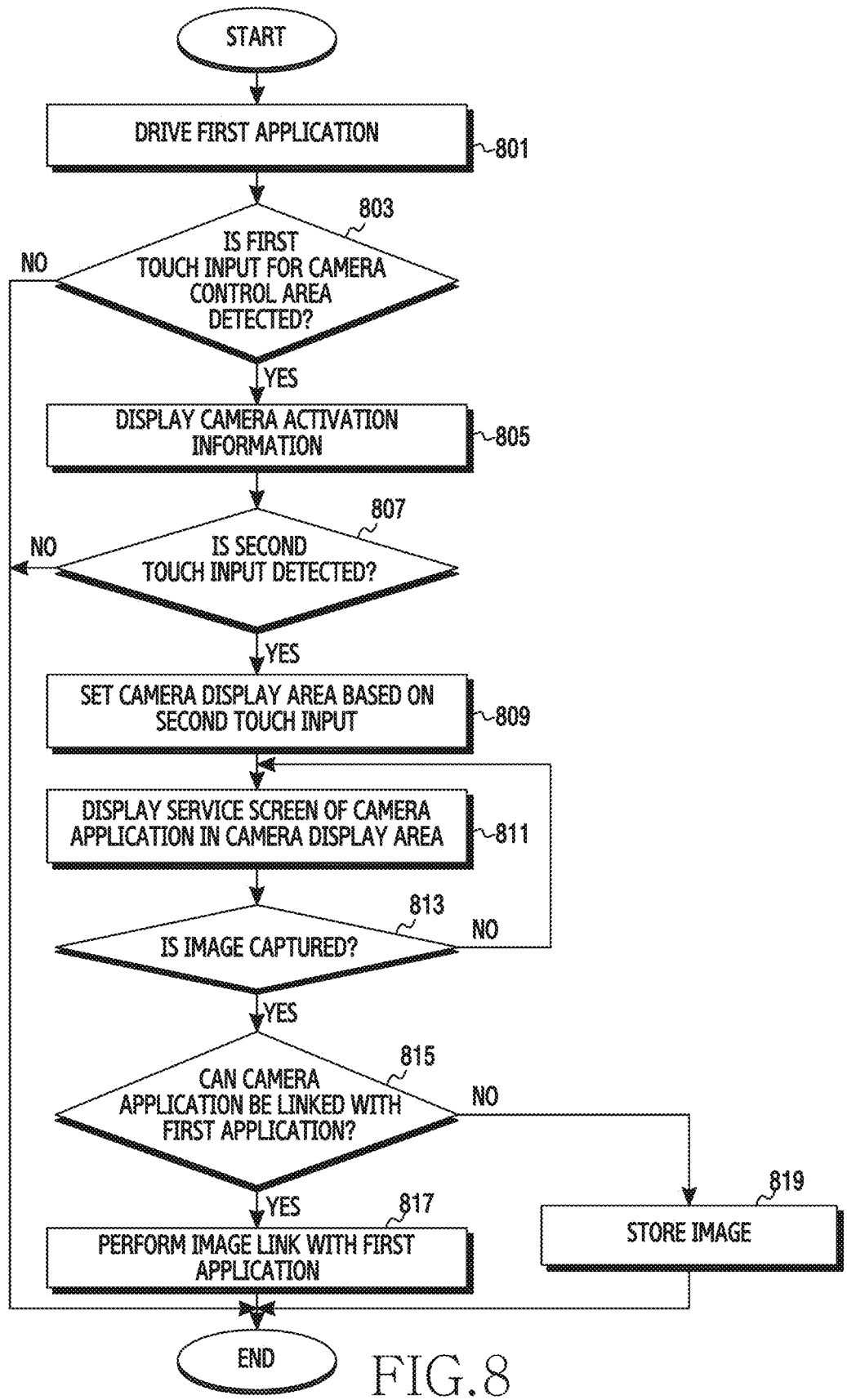
FIG. 8 is a flowchart of a process for controlling a camera device in an electronic device when a camera application is linked with another application, according to an embodiment of the present disclosure.

FIG. 8 is a flowchart of a process for controlling a camera device in an electronic device when a camera application is linked with another application, according to an embodiment of the present disclosure. FIGS. 9A to 9E illustrate a screen configuration for controlling a camera device in an electronic device when a camera application is linked with another application, according to an embodiment of the present disclosure. In the following description, the electronic device may include the electronic device 201 or at least a part (for example, processor 230) of the electronic device 201.

Referring to FIG. 8, the electronic device 201 may drive a first application among at least one application installed in the electronic device 201 in operation 801. For example, referring to FIG. 9A, when a messenger application is selected from at least one application installed in the electronic device 201 based on input information detected through the input/output interface 260, the processor 230 displays a service screen 900 of the messenger application on the display 270.

The electronic device 210 detects a first touch input for the camera control area in operation 803. For example, referring to FIG. 9B, the processor 230 may detect a tap input through at least some areas of the touch screen set as the camera control area.

When the first touch input for the camera control area is not detected, the electronic device 201 determines to not drive the camera device 220 and terminate the operation for controlling driving of the camera device 220.

When the first touch input for the camera control area is detected, the electronic device 201 displays camera activation information in at least some areas of the display corresponding to the camera control area in operation 805. For example, when a tap input for the camera control area is detected as indicated by reference numeral 910 in FIG. 9B, the processor 230 displays camera activation information 920 based on the placement area of the camera device 220.

The electronic device 201 determines whether a second touch input for the camera activation information is detected in operation 807. For example, the processor 230 determines whether a drag input is detected through at least some areas of the touch screen where the camera activation information is displayed.

When the second touch input for the camera activation information is not detected before a reference time passes from a time point when the camera activation information is displayed, the electronic device 201 determines to not drive the camera device 220. Accordingly, the electronic device 201 terminates the operation for controlling driving of the camera device 220.

When the second touch input for the camera activation information is detected, the electronic device 201 sets a camera display area in accordance with the second touch input in operation 809. For example, referring to FIG. 9C, when the drag input for the camera activation information 920 is detected as indicated by reference numeral 930, the processor 230 sets at least some areas of the display 270 as the camera display area in accordance with a drag distance.

The electronic device 201 displays driving information (for example, service screen of the camera application) of the camera device 220 in the camera display area in operation 811. For example, referring to FIG. 9D, the processor 230 displays a preview image acquired through the front camera device in the camera display area set to at least some areas of the display 270 based on the drag distance as indicated by reference numeral 940. In addition, the processor 230 displays a photographing button 942 at a position where the drag input is released.

The electronic device 201 determines whether an event for capturing an image is generated through the camera application in operation 813. For example, the processor 230 may determine whether a touch input for the photographing button 942 displayed in the camera display area is detected or whether a gesture input mapped to image capturing is detected.

When the event for capturing the image is not generated, the electronic device 201 maintains display of the camera driving information of the camera display area in operation 811.

When the event for capturing the image is generated, the electronic device determines whether the camera application and a first application are linked to each other in operation 815. For example, the processor 230 determines whether the first application provides a service using the image captured through the camera application.

When the camera application and the first application are linked to each other, the electronic device 201 links the image captured through the camera application with the first application in operation 817. For example, referring to FIG. 9E, the processor 230 may transmit the image captured through the camera application to a counterpart electronic device through a chat room of the messenger application as indicated by reference numeral 950. In addition, the processor 230 may store the image captured through the camera application in the memory 240.

When the camera application and the first application are not linked to each other, the electronic device 201 stores the image captured through the camera application in the memory 240 of the electronic device 201 in operation 819.

Figure 9A:
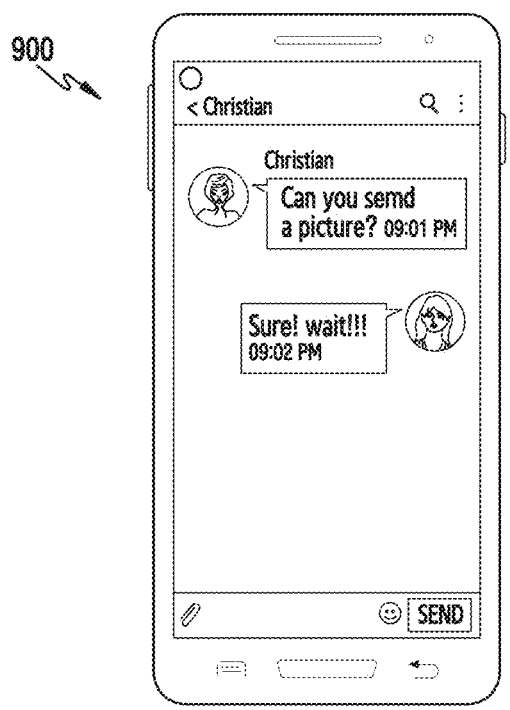
FIGS. 9A to 9E illustrate a screen configuration for controlling a camera device in an electronic device when a camera application is linked with another application, according to an embodiment of the present disclosure.
Figure 9B:
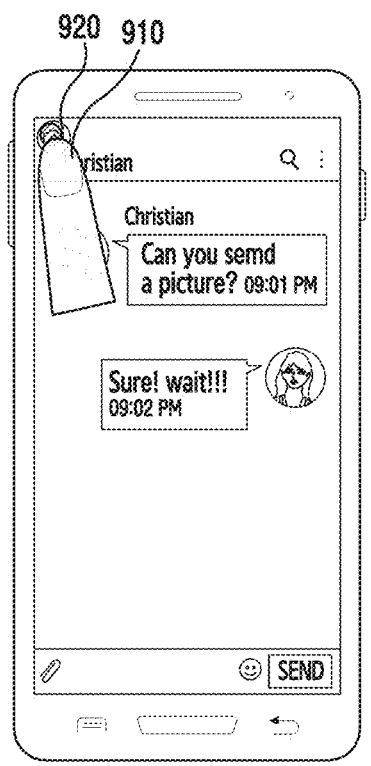
Figure 9C:
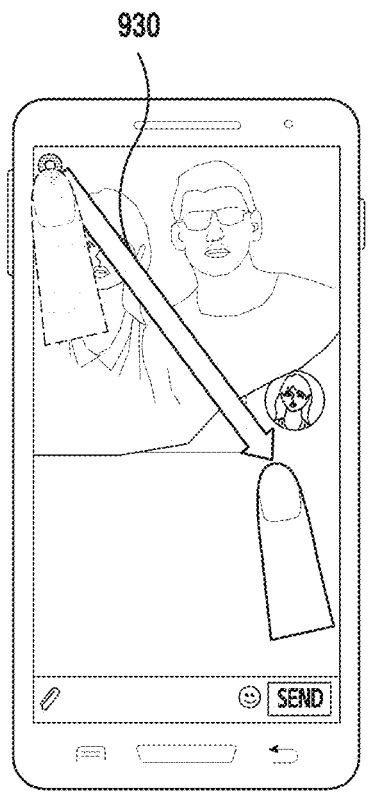
Figure 9D:
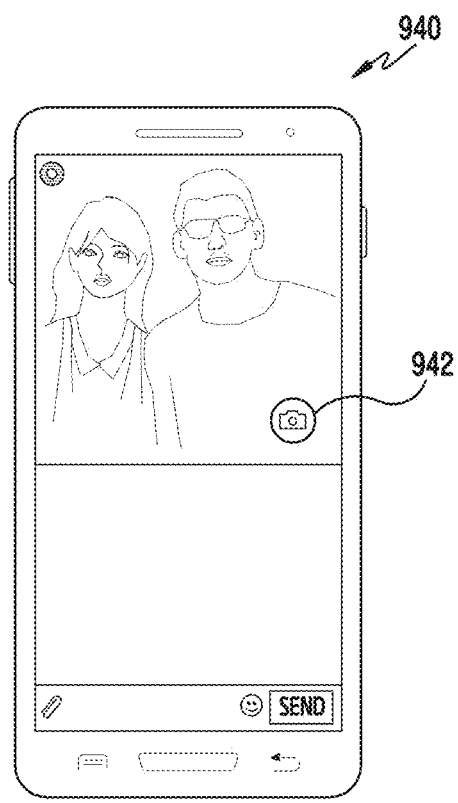
Figure 9E:
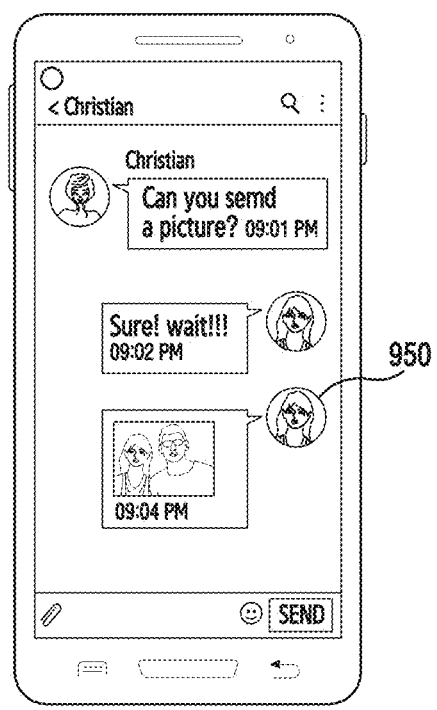

After the image is captured through the camera application displayed in at least some areas of the display 270, the electronic device 201 terminates driving of the camera device 220. For example, after the image is captured through the camera application, the processor 230 terminates the camera application, as illustrated in FIG. 9E.

Figure 10:
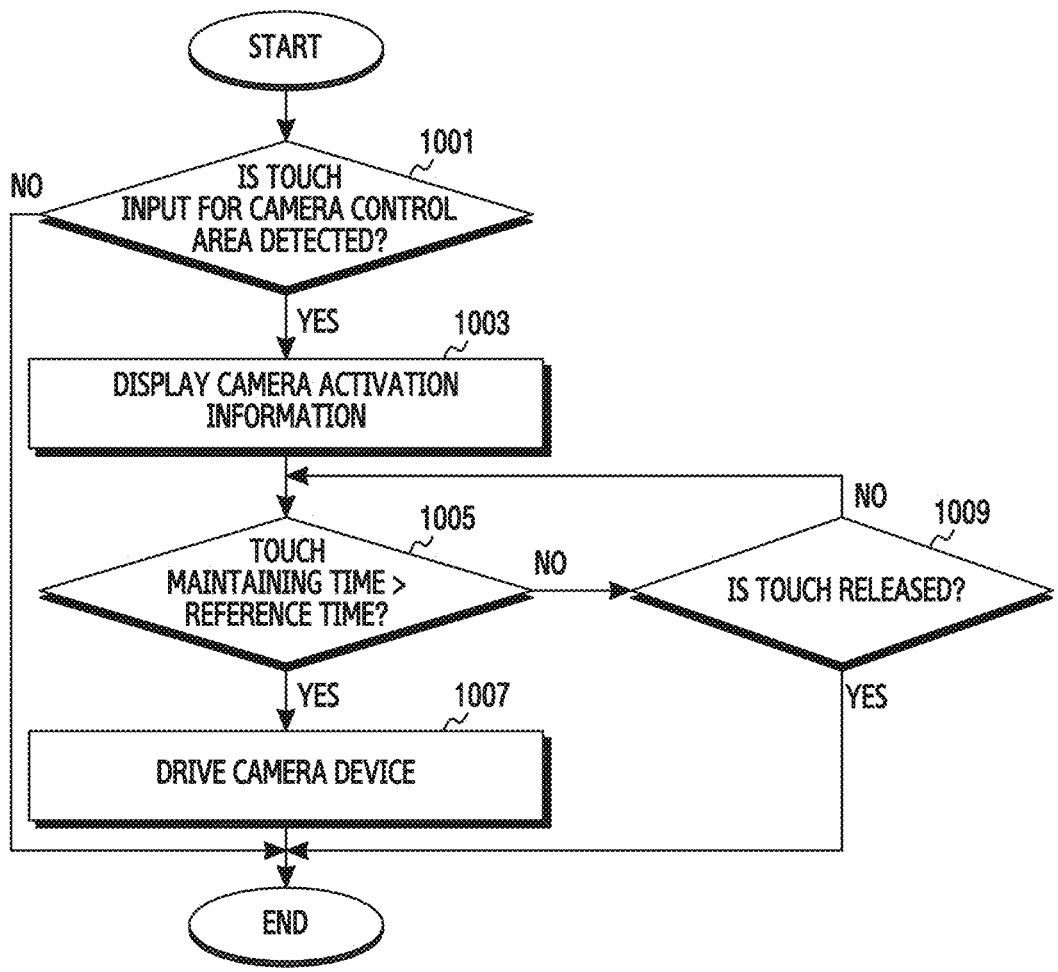
FIG. 10 is a flowchart of a process for controlling a camera device in an electronic device based on touch maintaining information of a camera control area, according to an embodiment of the present disclosure.
Figures 11A, 11B:
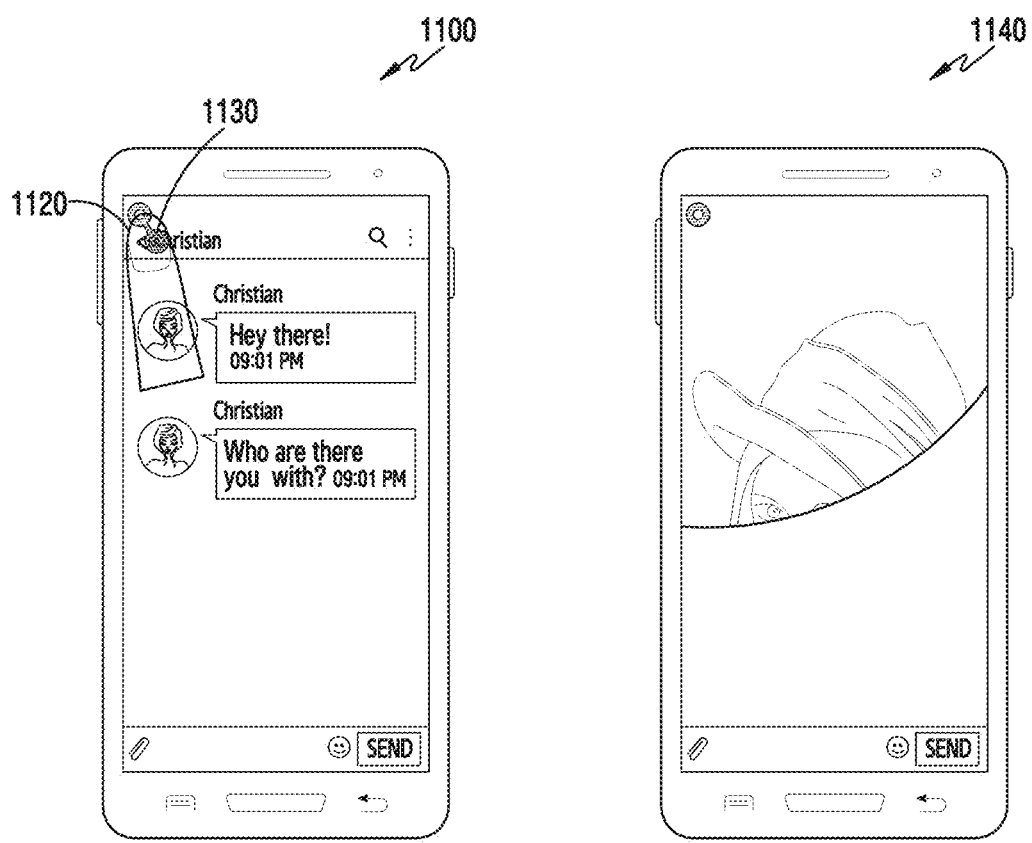
FIGS. 11A and 11B illustrate a screen configuration for controlling a camera device in an electronic device based on touch maintaining information of a camera control area, according to an embodiment of the present disclosure.

FIG. 10 is a flowchart of a process for controlling a camera device in an electronic device based on touch maintaining information of a camera control area, according to an embodiment of the present disclosure. FIGS. 11A and 11B illustrate a screen configuration for controlling a camera device in an electronic device based on touch maintaining information of a camera control area, according to an embodiment of the present disclosure. In the following description, the electronic device may include the electronic device 201 or at least a part (for example, processor 230) of the electronic device 201.

Referring to FIG. 10, an operation for controlling the camera device 220 based on the screen configuration of FIGS. 11A and 11B will be described. The electronic device 201 determines whether a touch input is detected through a camera control area set to at least some areas of the touch screen in operation 1001. For example, referring to FIG. H A, when the display 270 is in an active state as indicated by reference numeral 1100, the processor 230 may determine whether a hovering input for the camera control area set to be adjacent to the placement area of the camera device 220 is detected or whether a tap input for the camera control area of the touch screen is detected.

When a touch input is not detected through the camera control area, the electronic device 201 determines to not drive the camera device 220 and terminate the operation for controlling the camera device 220.

When the touch input is detected through camera control area, the electronic device 201 displays camera activation information in at least some areas of the display corresponding to the camera control area in operation 1003. For example, when a hovering input is detected through the camera control area as indicated by reference numeral 1120, the processor 230 displays camera activation information 1130 to be adjacent to the placement area of the camera device 220, as illustrated in FIG. 11A. The processor 230 displays the camera activation information 1130 in at least some areas different from the placement area of the camera device 220 in order to prevent the image sensor of the front camera device from becoming dirty due to the touch input for controlling the camera device 220. That is, the processor 230 displays the camera activation information 1130 in at least some areas different from the placement area of the camera device 220 to allow the user to touch at least some areas different from the placement area of the camera device 220.

The electronic device 201 determines whether a touch maintaining time for the camera activation information exceeds a reference time in operation 1005. For example, the processor 230 determines whether the touch maintaining time for the camera activation information 1130 exceeds the reference time, as illustrated in FIG. 11A.

When the touch maintaining time for the camera activation information is shorter than the reference time, the electronic device 201 determines whether the touch input for the camera activation information is released in operation 1009. For example, the processor 230 determines whether a touch input 1120 for the camera activation information 1130 is released, as illustrated in FIG. 11A.

When the touch input for the camera activation information is released, the electronic device 201 determines to not drive the camera device 220 and terminates the operation for controlling driving of the camera device 220.

When the touch input for the camera activation information is maintained, the electronic device 201 determines whether the touch maintaining time for the camera activation information exceeds the reference time again in operation 1005.

When the touch maintaining time for the camera activation information exceeds the reference time, the electronic device 201 drives the camera device 220 in operation 1007. For example, referring to FIG. 11B, when the touch maintaining time for the camera activation information 1130 exceeds the reference time, the processor 230 displays the service screen of the camera application on the display 270 through an image effect that makes the service screen of the camera application spread from the placement area of the camera device 220. For example, the service screen of the camera application may include a preview image acquired through the front camera device or the back camera device.

Figure 12:
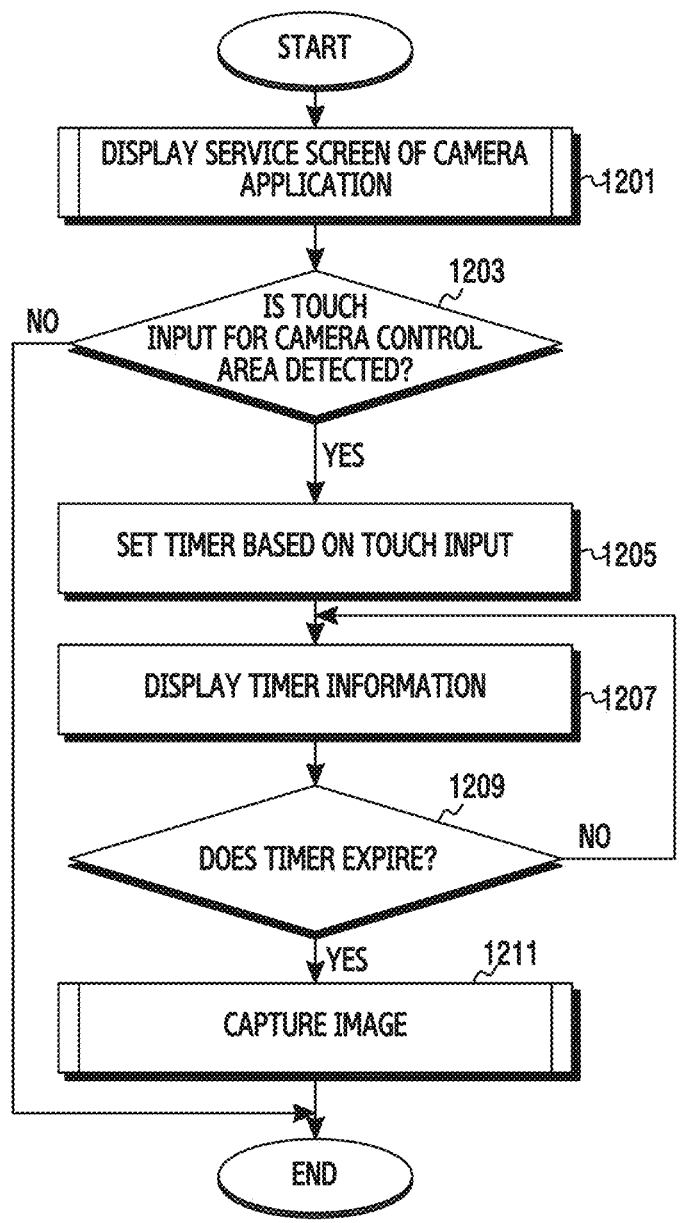
FIG. 12 is a flowchart of a process for setting a timer of a camera device based on touch information of a camera control area in an electronic device, according to an embodiment of the present disclosure.
Figure 13C:
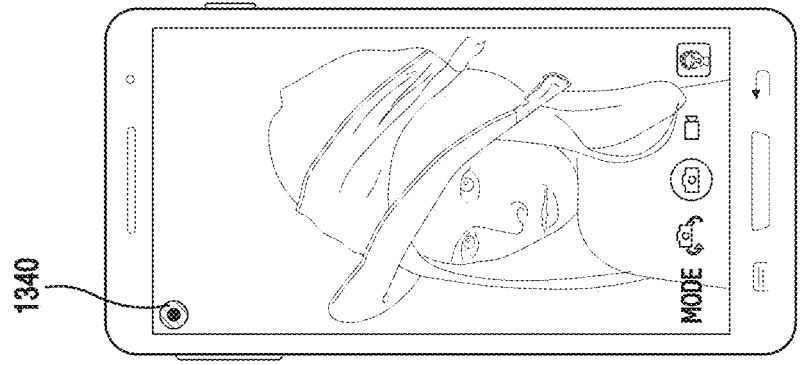
FIGS. 13A to 13C illustrate a screen configuration for setting a timer of a camera device based on touch information of a camera control area in an electronic device, according to an embodiment of the present disclosure.
Figure 13B:
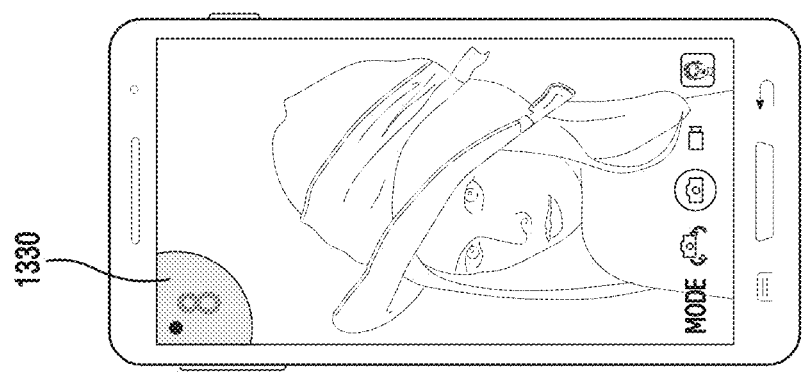
Figure 13A:
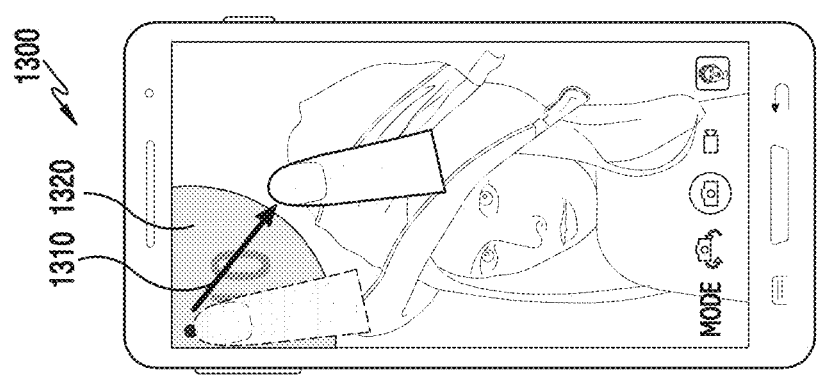

FIG. 12 is a flowchart of a process for setting a timer of a camera device based on touch information of a camera control area in an electronic device, according to an embodiment of the present disclosure. FIGS. 13A to 13C illustrate a screen configuration for setting a timer of a camera device based on touch information of a camera control area in an electronic device, according to an embodiment of the present disclosure. In the following description, the electronic device may include the electronic device 201 or at least a part (for example, processor 230) of the electronic device 201.

Referring to FIG. 12, an operation for setting a timer of a camera device using the screen configuration of FIGS. 13A to 13C will be described. The electronic device 201 displays a service screen of a camera application in at least some areas of the display in operation 1201. For example, the processor 230 executes the camera application based on touch information of a camera control area, as described in operations 401 to 407 of FIG. 4 or operations 1001 to 1009 of FIG. 10. For example, when a touch input for an icon of the camera application is detected, the processor 230 executes the corresponding camera application.

The electronic device 201 determines whether the touch input for the camera control area is detected in operation 1203. For example, referring to 13A, the processor 230 displays a preview image of the front camera device on the display 270 by executing the camera application as indicated by reference numeral 1300. The processor 230 may determine whether a drag input 1310 is detected from the placement area of the camera device 220 in a state where the preview image of the front camera device is displayed. The processor 230 determines whether a subsequent tap input for the camera control area is detected in the state where the preview image of the front camera device is displayed.

When the touch input for the camera control area is not detected, the electronic device 201 determines to not set a timer of the camera device. Accordingly, the electronic device terminates the operation for setting the timer of the camera device 220.

When the touch input is detected through the camera control area, the electronic device 201 sets the timer of the camera device in accordance with the touch input in operation 1205. For example, the processor 230 sets the timer of the camera device 220 to a timer required time corresponding to a drag distance from the placement area of the camera device 220, as illustrated in FIG. 13A. The processor 230 sets the timer of the camera device 220 to a time corresponding to a distance between the placement area of the camera device 220 and a position where a tap input is detected.

The electronic device 201 displays timer information of the camera device 220 set to correspond to the touch input on the display 270 in operation 1207. For example, the processor 230 displays time information set to correspond to the drag distance from the placement area of the camera device 220 as indicated by reference numeral 1320 in FIG. 13A.

The electronic device 201 determines whether the time set to correspond to the touch input has expired in operation 1209.

When the time set to correspond to the touch input has not expired, the electronic device 201 displays timer information of the camera device 220 on the display 270 in operation 1207. For example, referring to FIG. 1313, the processor 230 updates the time information displayed in accordance with the elapse of time. That is, the processor 230 updates the timer of the camera device 220 such that display of the time information becomes gradually smaller in accordance with the elapse of time from a time point when the timer is set.

When the time set to correspond to the touch input expires, the electronic device 201 captures an image by driving the camera device 220 in operation 1211. For example, when the time set to correspond to the drag distance expires, the processor 230 captures an image by using the front camera device. In this case, the processor 230 removes the display of the time information from the display 270 as illustrated in FIG. 13C. In addition, if it is determined that an amount of light for image capturing is insufficient, the processor 230 may acquire the amount of light for the image capturing by changing a color of the display into a bright color.

Figure 14:
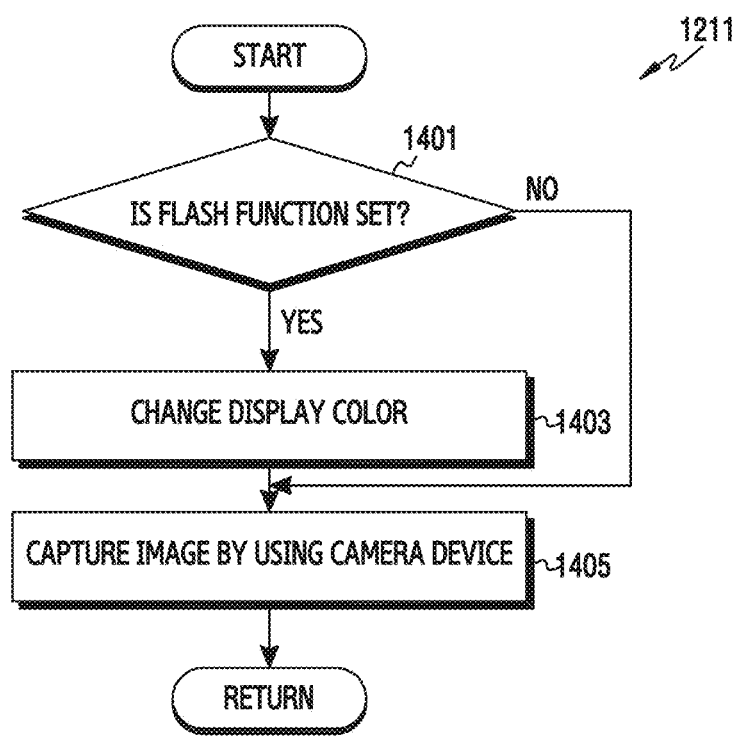
FIG. 14 is a flowchart of a process for providing a flash effect in an electronic device, according to an embodiment of the present disclosure.

FIG. 14 is a flowchart of a process for providing a flash effect in an electronic device, according to an embodiment of the present disclosure. FIGS. 15A to 15D illustrate a screen configuration for providing a flash effect in an electronic device, according to an embodiment of the present disclosure.

Referring to FIG. 14, an operation for capturing an image using the screen configuration of FIG. 15, as in operation 1211 of FIG. 12, will be described. In the following description, the electronic device may include the electronic device 201 or at least a part (for example, processor 230) of the electronic device 201 of FIG. 2.

When an image capturing event is generated (operation 1209 of FIG. 12), the electronic device 201 determines whether a flash function is set. For example, when the time set for the timer of the camera device 220 expires, the processor 230 may determine that the image capturing event is generated. The processor 230 displays camera activation information 1510 based on the placement area of the camera device 220 to make user's eyes face the front image capturing device in response to the generation of the image capturing event. In this case, the processor 230 determines whether a flash setting menu of the camera device 220 is set in an active state.

When the flash function of the camera device 220 is not set, the electronic device 201 captures the image by driving the camera device 220 in operation 1405. For example, the processor 230 captures the image by using the activated front camera device of the camera device 220.

When the flash function of the camera device 220 is set, the electronic device 201 changes a color of the display 270 into a color set as the flash function in operation 1403. For example, referring to FIGS. 15B and 15C, when acquiring an amount of light for the image capturing, the processor 230 displays a background image such that a bright colored (for example, white) background image spreads across an entire area of the display 270 based on the placement area of the camera device 220 as indicated by reference numerals 1520 and 1530.

The electronic device 201 captures the image by driving the camera device 220 while changing the color of the display 270 by the flash function in operation 1405.

When the image is captured, the electronic device 201 may change the color of the display 270 in accordance with an image effect which the user desires. For example, the processor 230 may set an image effect having a warm feeling based on the user's input information. In this case, the processor 230 displays a background image such that a yellow background image, for example, spreads across an entire area of the display 270 based on the placement area of the camera device 220 while capturing the image.

Figure 15A:
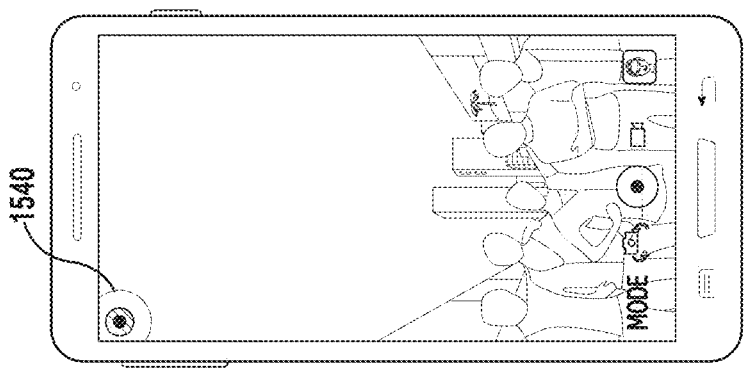
FIGS. 15A to 15D illustrate a screen configuration for providing a flash effect in an electronic device, according to an embodiment of the present disclosure.
Figure 15B:
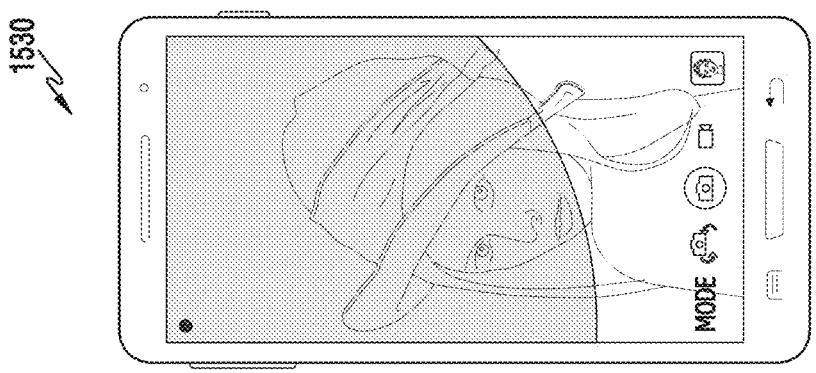
Figure 15C:
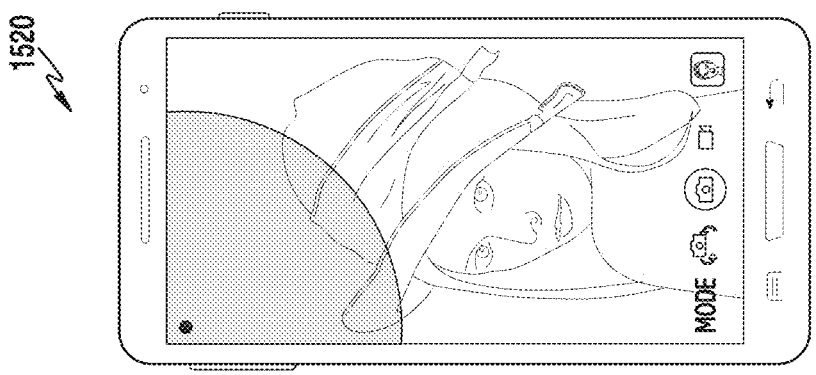
Figure 15D:
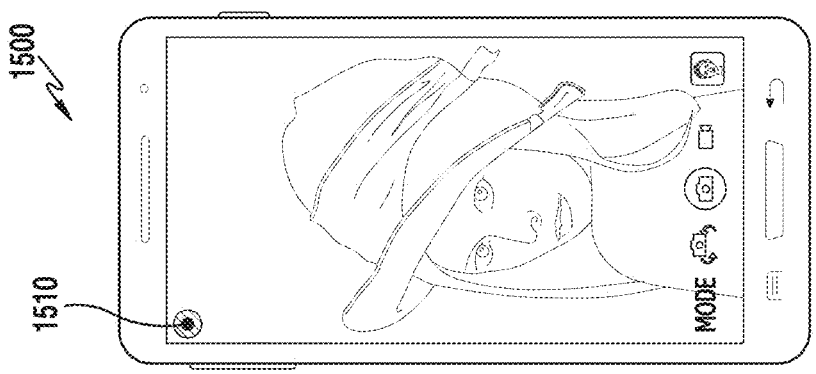

When video is photographed, the electronic device 201 may display audio input information to allow the user to identify a size of an audio signal input through the microphone device 140. For example, when video is photographed through the back camera device, the processor 230 may display audio input information 1540 corresponding to a size of an audio signal based on the placement area of the camera device 220, as illustrated in FIG. 15D.

Figure 16:
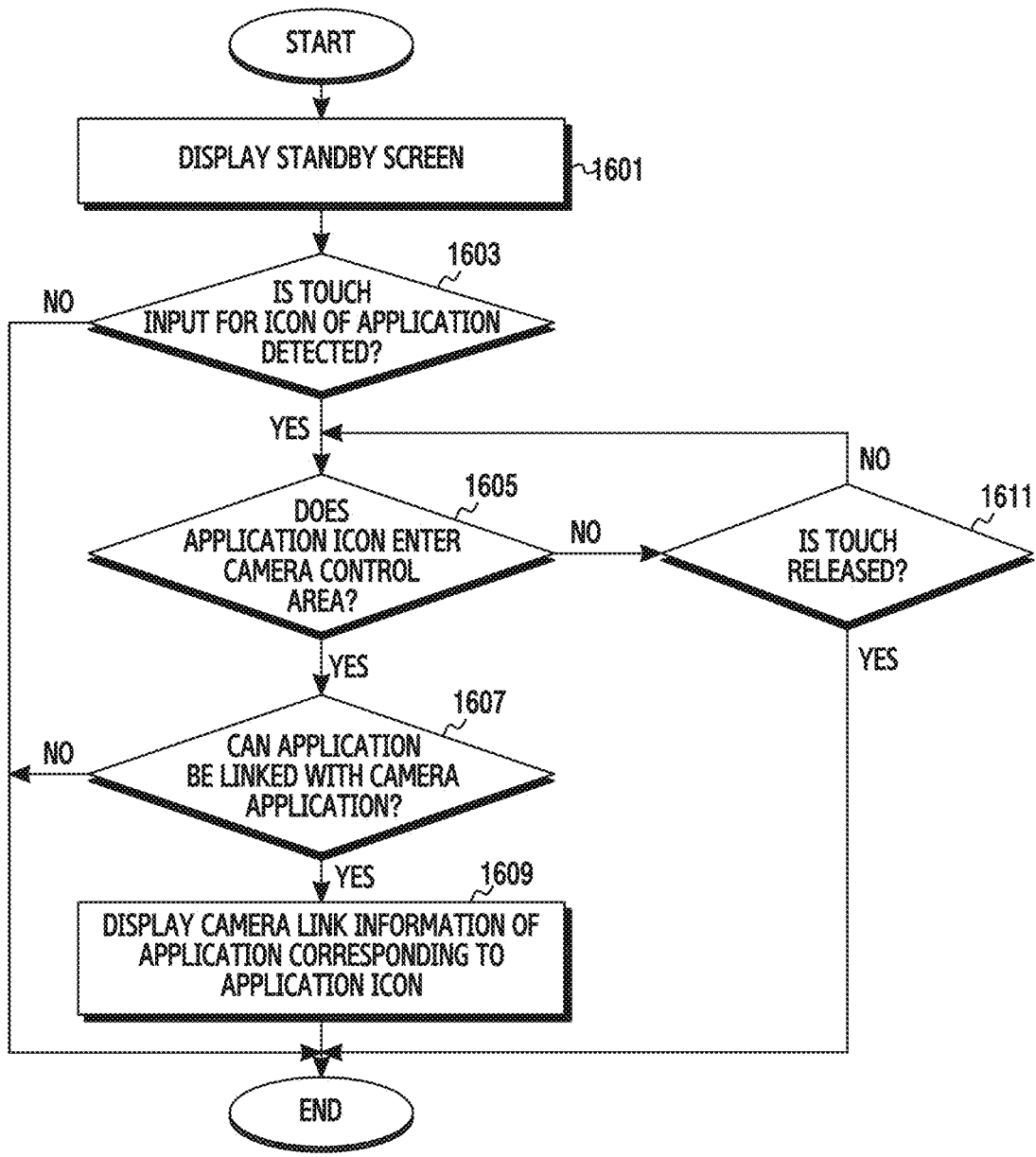
FIG. 16 is a flowchart of a process for providing a camera service through an application in an electronic device, according to an embodiment of the present disclosure.
Figures 17A, 17B:
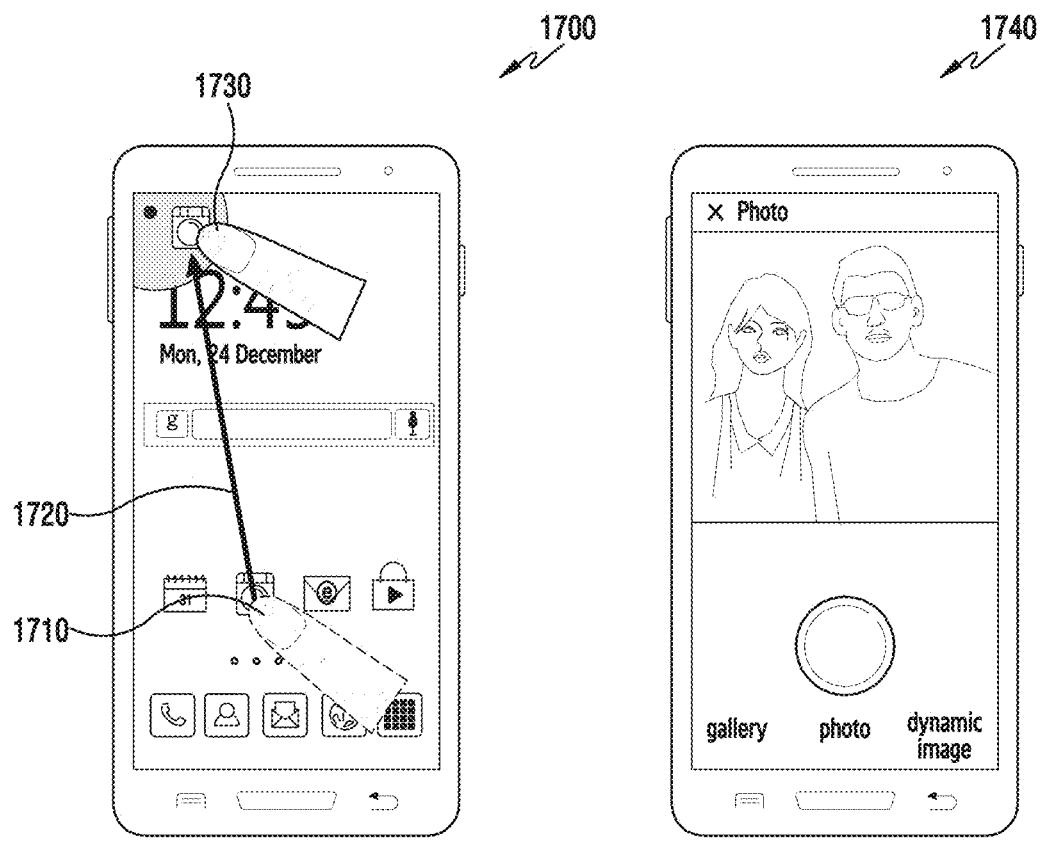
FIGS. 17A and 17B illustrate a screen configuration for providing a camera service through an application in an electronic device, according to an embodiment of the present disclosure.

FIG. 16 is a flowchart of a process for providing a camera service through an application in an electronic device, according to an embodiment of the present disclosure. FIGS. 17A and 17B illustrate a screen configuration for providing a camera service through an application in an electronic device, according to an embodiment of the present disclosure. In the following description, the electronic device may include the electronic device 201 or at least a part (for example, processor 230) of the electronic device 201.

Referring to FIG. 16, an operation for providing a camera service using the screen configuration of FIGS. 17A and 17B will be described. The electronic device 201 displays a standby screen including an icon of at least one application in operation 1601. For example, referring to FIG. 17A, the processor 230 displays the standby screen including icons of applications installed in the electronic device 201 as indicated by reference numeral 1700.

The electronic device 201 determines whether a touch input for the icon of the application is detected in the standby screen in operation 1603. For example, the processor 230 determines whether a touch input for an icon of one of a plurality of applications displayed on the standby screen is detected, as illustrated in FIG. 17A.

When the touch input for the icon of the application is not detected on the standby screen, the electronic device 201 determines to not provide the camera service and terminates the operation for providing the camera service.

When the touch input for the application icon included in the standby screen is detected, the electronic device 201 determines whether the application icon enters the camera control area by the touch input in operation 1605. For example, the processor 230 determines whether a first application icon 1710 on which the touch input is detected enters the camera control area through a drag input 1720 on a standby screen 1700 as indicated by reference numeral 1730 in FIG. 17A. For example, when the touch input of the first application icon 1710 is released within the camera control area, the processor 230 determines that the first application icon 1710 enters the camera control area. For example, after detecting a first touch input for selecting the first application icon 1710, the processor 230 determines whether a second touch input for determining a movement location of the first application icon 1710 is detected within the camera control area, as illustrated in FIG. 17A. For example, the second touch input may be determined as being effective only when the corresponding touch input is detected within a reference time from a time point when the first touch input is detected.

When the application icon does not enter the camera control area, the electronic device 201 determines whether the touch input for the application icon is released in operation 1611. For example, the processor 230 determines whether the touch input for the first application icon 1710 is released outside the camera control area, as illustrated in FIG. 17A.

When the touch input for the application icon is maintained, the electronic device 201 determines whether the application icon enters the camera control area by the touch input in operation 1605.

When the touch input for the application icon is released, the electronic device 201 determines to not provide the camera service and terminates the operation for providing the camera service. For example, the processor 230 may change a location of the application icon to a location where the touch input for the application icon is released.

When the application icon enters the camera control area, the electronic device 201 determines whether an application corresponding to the application icon can be linked with the camera application in operation 1607. For example, the processor 230 determines whether the camera service can be provided through the application corresponding to the first application icon 1710.

When the application corresponding to the application icon is not linked with the camera application, the electronic device 201 terminates the operation for providing the camera service.

When the application corresponding to the application icon is linked with the camera application, the electronic device 201 displays link information between the application corresponding to the application icon and the camera device 220 on the display 270 in operation 1609. For example, when the camera service can be provided through the first application corresponding to the first application icon 1710, the processor 230 displays a camera service screen of the first application on the display 270 as indicated by reference numeral 1740 in FIG. 17B.

Figure 18:
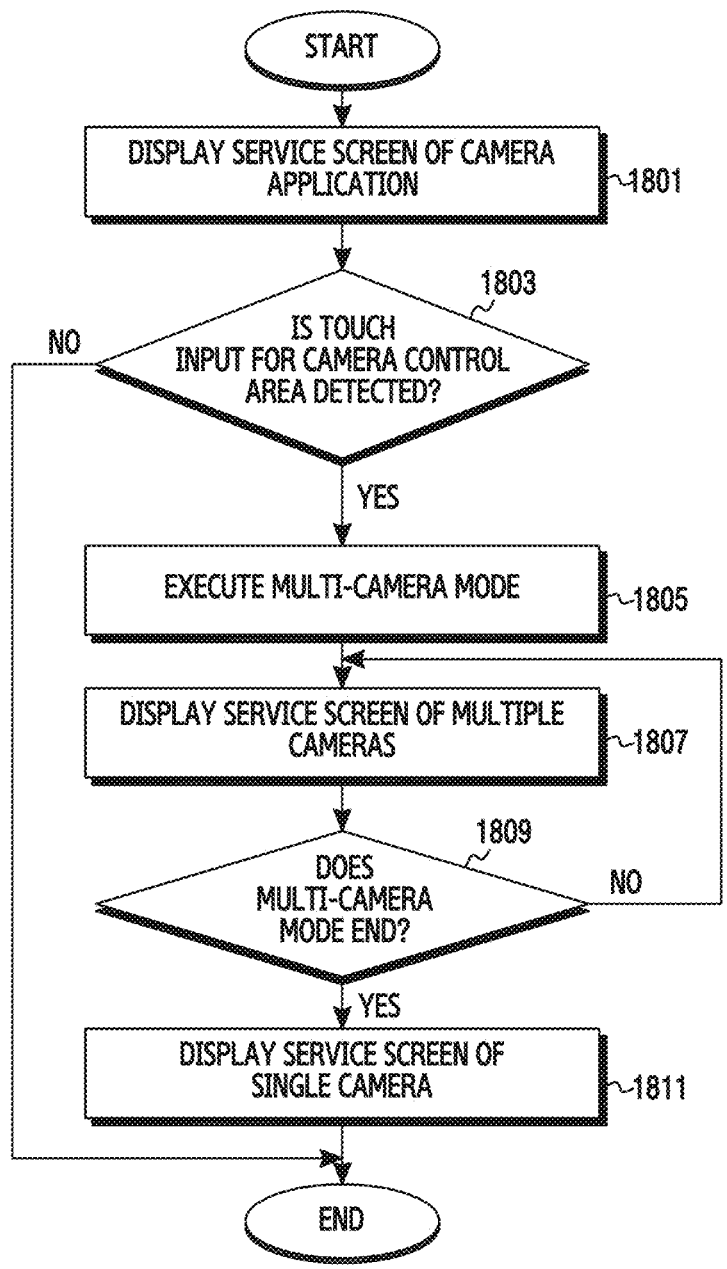
FIG. 18 is a flowchart of a process for providing a multi-camera service in an electronic device, according to an embodiment of the present disclosure.

FIG. 18 is a flowchart of a process for providing a multi-camera service in an electronic device, according to an embodiment of the present disclosure. FIGS. 19A to 19E illustrate a screen configuration for providing a multi-camera service in an electronic device, according to an embodiment of the present disclosure. In the following description, the electronic device may include the electronic device 201 or at east a part (for example, processor 230) of the electronic device 201.

Figures 19A, 19B, 19C:
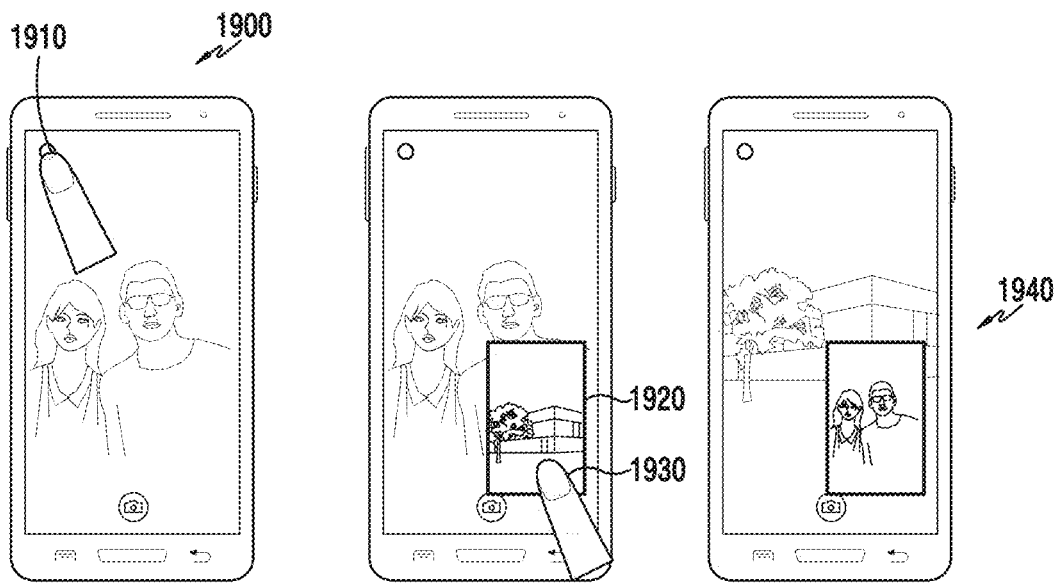
FIGS. 19A to 19F illustrate a screen configuration for providing a multi-camera service in an electronic device, according to an embodiment of the present disclosure.

Referring to FIG. 18, an operation for providing a multi-camera service using the screen configuration of FIG. 19 will be described. The electronic device 201 displays a service screen of a camera application on the display 270 in operation 1801. For example, referring to FIG. 19A, when the electronic device 201 operates in a front camera mode, the processor 230 displays a preview image collected through the front camera device on the display 270 as indicated by reference numeral 1900. In this case, the processor 230 displays the service screen of the camera application on the display 270 like operations 401 to 407 of FIG. 4 or operations 1001 to 1009 of FIG. 10.

In operation 1803, the electronic device 201 determines whether a touch input is detected through the camera control area. For example, the processor 230 determines whether a tap input 1910 for the camera control area adjacent to the placement area of the camera device 220 is detected in a state where a preview image of the front camera device is displayed, as illustrated in FIG. 19A.

When a touch input for the camera control area is not detected, the electronic device 201 determines to not provide a multi-camera service. Accordingly, the electronic device 201 terminates the operation for providing the multi-camera service.

When the touch input for the camera control area is detected, the electronic device 201 switches a camera mode of the electronic device 201 to a multi-camera mode in operation 1805. For example, when the tap input 1910 for the camera control area is detected while the service is provided through the front camera device, the processor 230 may additionally activate the back camera device. For example, when the tap input 1910 for the camera control area is detected while the service is provided through the back camera device, the processor 230 may additionally activate the front camera device.

Figures 19D, 19E, 19F:
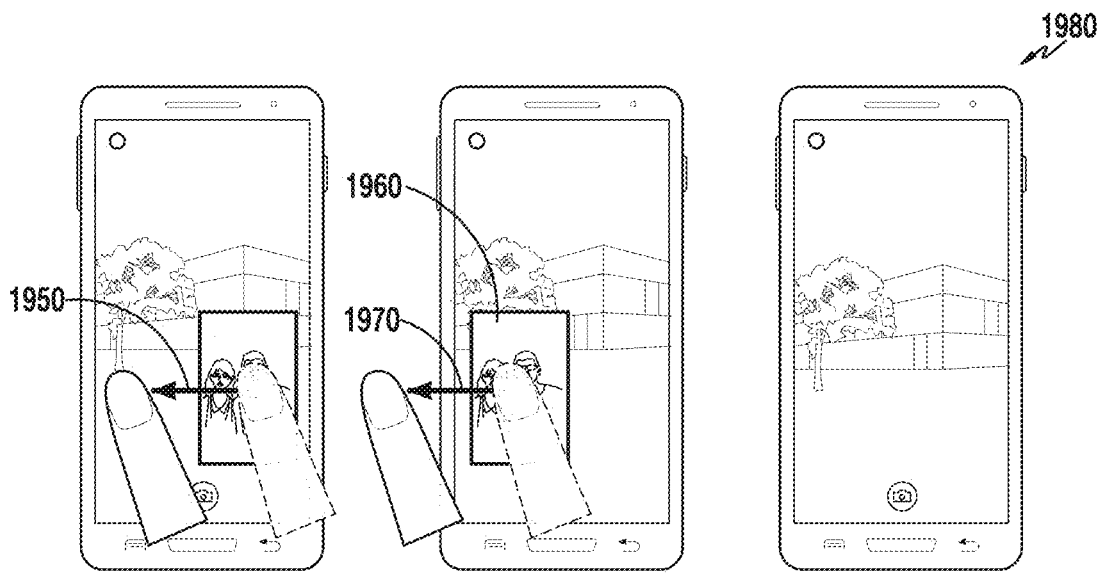

The electronic device 201 displays a service screen using multiple cameras on the display 270 based on the multi-camera mode in operation 1807. For example, referring to FIG. 19B, the processor 230 displays a preview image 1920 of the activated hack camera device to overlap at least a part of the preview image 1910 of the front camera device based on the multi-camera mode. In addition, when a drag input for an edge area of the preview image 1920 of the back camera device is detected, the processor 230 controls a size of the preview image 1920 of the back camera device in accordance with a drag distance. Referring to FIG. 19C, when a tap input for the displayed small preview image 1920 of the back camera device is detected, the processor 230 reverses display areas of the preview image 1910 of the front camera device and the preview image 1920 of the back camera device as indicated by reference numeral 1940. Referring to FIGS. 19D and 19E, when a drag input for the displayed small preview image of the front camera is detected as indicated by reference numeral 1950 in FIG. 19D, the processor 230 updates a display location of the preview image of the front camera according to the drag input as indicated by reference numeral 1960 in FIG. 19E.

The electronic device 201 determines whether the multi-camera mode ends in operation 1809. For example, when the drag input for the displayed small preview image is detected to move outside the area of the display 270 as indicated by reference numeral 1970 in FIG. 19E, the processor 230 determines that the multi-camera mode ends.

When the multi-camera mode does not end, the electronic device 201 maintains the service screen using the multiple cameras displayed on the display 270 in operation 1807.

When the multi-camera mode ends, the electronic device 201 switches the camera mode of the electronic device 201 to a single camera mode and displays a service screen of a single camera device on the display 270 in operation 1811. For example, referring to FIG. 19F, when an event corresponding to the type of the preview image acquired through the front camera device is detected, as indicated by reference numeral 1970 in FIG. 19E, the processor 230 displays the preview screen of the back camera device on the display 270, as indicated by reference numeral 1980.

Figure 20:
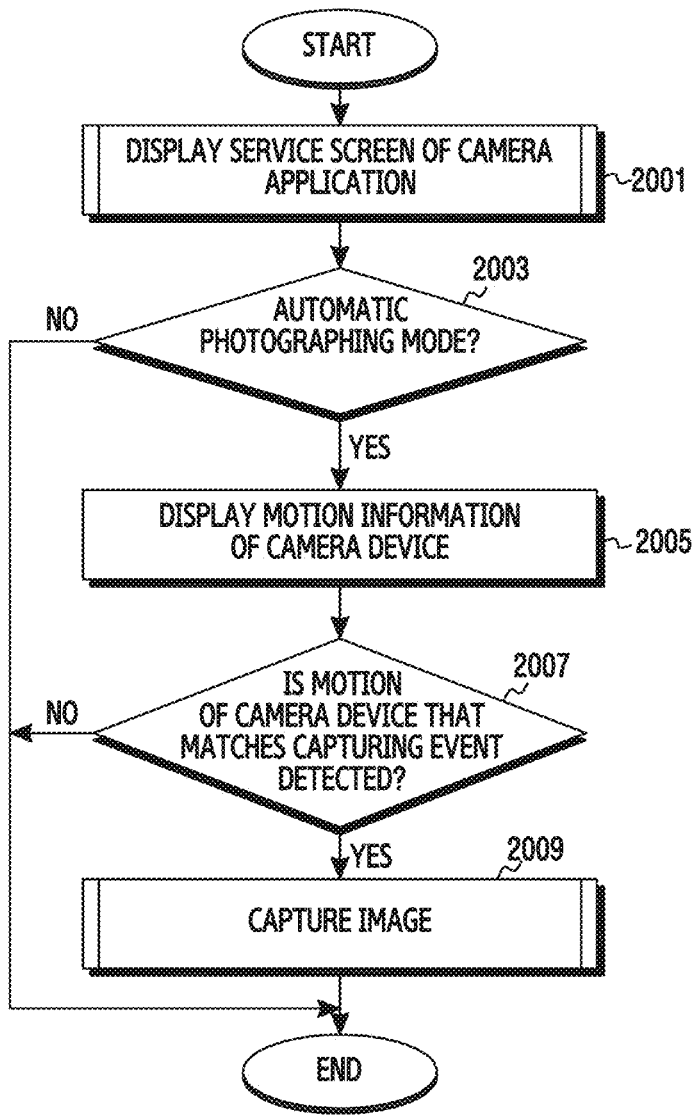
FIG. 20 is a flowchart of a process for providing an automatic photographing service in an electronic device, according to an embodiment of the present disclosure.
Figure 21:
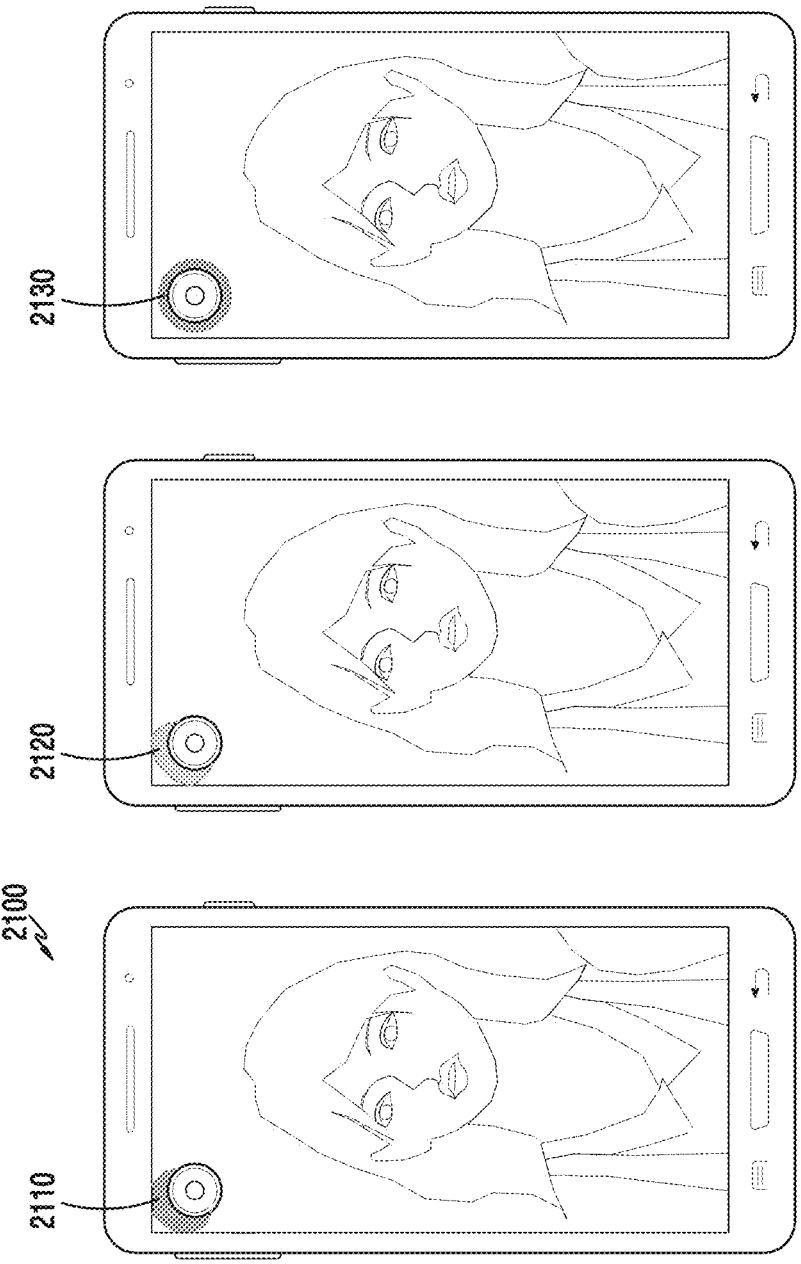
FIGS. 21A to 21C illustrate a screen configuration for providing an automatic photographing service in an electronic device, according to an embodiment of the present disclosure.

FIG. 20 is a flowchart of a process for providing an automatic photographing service in an electronic device, according to an embodiment of the present disclosure. FIGS. 21A to 21C illustrate a screen configuration for providing an automatic photographing service in an electronic device, according to an embodiment of the present disclosure. In the following description, the electronic device may include the electronic device 201 or at least a part (for example, processor 230) of the electronic device 201.

Referring to FIG. 20, an operation for providing the automatic photographing service using the screen configuration of FIGS. 21A to 21C will be described. The electronic device 201 displays a service screen (for example, preview image) of a camera application on the display 270 in operation 2001. For example, the processor 230 executes the camera application based on touch information of a camera control area through operations 401 to 407 of FIG. 4 or operations 1001 to 1009 of FIG. 10. Referring to FIG. 21A, the processor 230 displays the preview image of the front camera device on the display 270 as indicated by reference numeral 2100.

The electronic device 201 determines whether an automatic photographing mode is set to the camera application in operation 2003. For example, the processor 230 determines whether an automatic photographing menu is set in an activated state based on input information detected through the input/output interface 260.

When the automatic photographing mode is not set to the camera application, the electronic device 201 terminates the operation for providing the automatic photographing service. In this case, the electronic device 201 captures an image based on a touch input of a photographing button displayed on the service screen of the camera application.

When the automatic photographing mode is set, the electronic device 201 displays motion information of the camera device 220 in at least some areas of the display 270 in operation 2005. For example, when the automatic photographing mode is set, the processor 230 displays motion information of the camera device 220 corresponding to a location and an angle of the electronic device 201 based on the placement area of the camera device 220 as indicated by reference numeral 2110 in FIG. 21A.

The electronic device 201 determines whether a motion of the camera device 220 that a capturing event matches is detected in operation 2007. For example, the processor 230 determines whether motion information of the electronic device 201 that matches the location and angle of the electronic device 201 preset for image capturing is detected. For example, the preset location and angle of the electronic device 201 may be set by a user's input or may include at least one of locations and angles of the electronic device 201 that match the image acquired through the front camera mode.

When the motion of the camera device 220 that the capturing event matches is not detected, the electronic device 201 displays changed motion information of the camera device 220 in at least some areas of the display 270 in operation 2005. For example, referring to FIG. 21B, the processor 230 may change the motion information of the camera device 220 displayed based on the placement area of the camera device 220 according to a change in the location and angle of the electronic device 201 as indicated by reference numeral 2120.

When the motion of the camera device 220 that the capturing event matches is detected, the electronic device 201 captures the image by driving the camera device (for example, front camera device) in operation 2009. For example, referring to FIG. 21C, when motion information of the electronic device 201 which matches the location and angle of the electronic device 201 preset for image capturing is detected, the processor 230 displays matching information by the location and angle of the electronic device 201 to allow the user to recognize an automatic photographing time point as indicated by reference numeral 2130. The processor 230 captures the image by using the front camera device. For example, the processor 230 may acquire an amount of light for the image capturing or perform the image capturing and change a color of the display 270 at the same time for an image effect.

Figure 22:
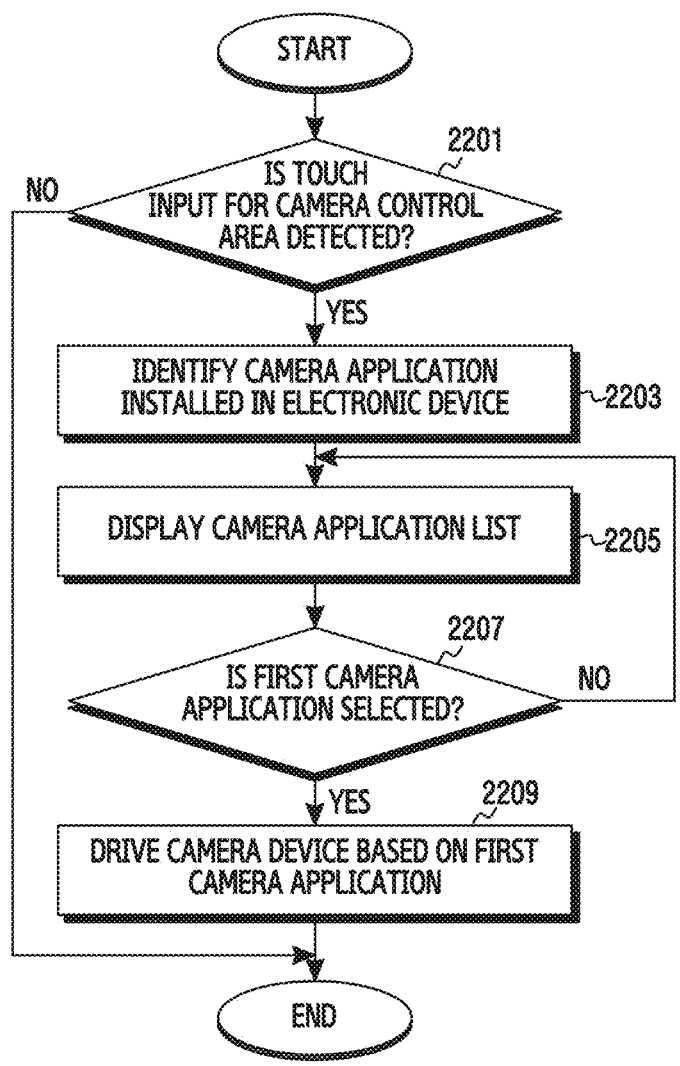
FIG. 22 is a flowchart of a process for controlling a camera device in accordance with a camera application in an electronic device, according to an embodiment of the present disclosure.
Figure 23A:
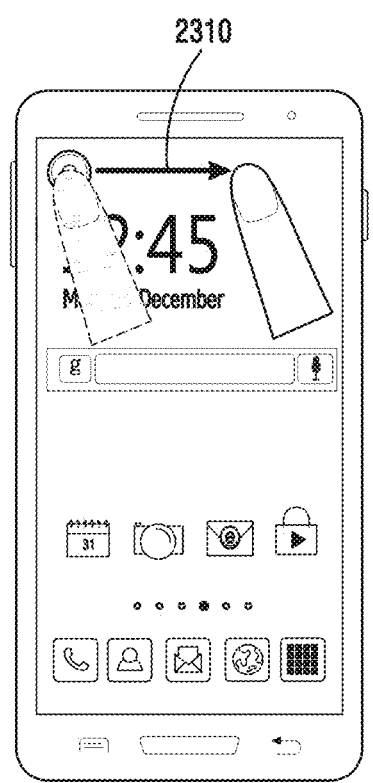
FIGS. 23A and 23B illustrate a screen configuration for controlling a camera device in accordance with a camera application in an electronic device, according to an embodiment of the present disclosure.
Figure 23B:

FIG. 22 is a flowchart of a process for controlling a camera device in accordance with a camera application in an electronic device, according to an embodiment of the present disclosure. FIGS. 23A and 23B illustrate a screen configuration for controlling a camera device in accordance with a camera application in an electronic device, according to an embodiment of the present disclosure. In the following description, the electronic device may include the electronic device 201 or at least a part (for example, processor 230) of the electronic device 201.

Referring to FIG. 22, an operation for controlling the camera device 220 using the screen configuration of FIGS. 23A and 23B will be described. The electronic device 201 determines whether a first type touch input for the camera control area is detected in operation 2201. For example, referring to FIG. 23A, the processor 230 determines whether a drag input 2310 in a right direction of the placement area of the camera device 220 is detected.

When the first type touch input for the camera control area is not detected, the electronic device 201 terminates the operation for setting the camera application. For example, when the drag input in a down direction for the camera control area is detected, the electronic device 201 executes one camera application that is set as a basic application among a plurality of applications installed in the electronic device 201.

When the first type touch input for the camera control area is detected, the electronic device 201 determines at least one camera application installed in the electronic device 201 in operation 2203. For example, the processor 230 may extract camera application information stored in the memory 240.

In operation 2205, the electronic device 201 displays a camera application list including at least one camera application installed in the electronic device 201. For example, referring to FIG. 23B, the processor 230 displays icons of camera applications installed in the electronic device 201 on the display 270 such that the icons are output in the placement area of the camera device 220.

In operation 2207, the electronic device 201 determines whether a first camera application which is one of the applications included in the camera application list is selected. For example, the processor 230 determines whether a touch input for one of the icons of the camera applications displayed in the camera control area is detected as illustrated in FIG. 23B.

When a selection input for the first camera application is not detected, the electronic device 201 maintains display of the camera application list in operation 2205. In addition, when an input for the camera application list is not detected until a reference time passes from a time point when the camera application list is displayed, the electronic device 201 determines to not select the camera application for controlling the camera device 220 and terminates the operation.

When the selection input for the first camera application is detected, the electronic device 201 drives the camera device 220 based on the first camera application in operation 2209. For example, the processor 230 controls the camera device 220 by executing the first camera application. Accordingly, the processor 230 performs initial settings on the camera device 220 based on camera setting information set to the first camera application. In addition, the processor 230 sets the first camera application as a basic camera application of the electronic device 201.

Figure 24:
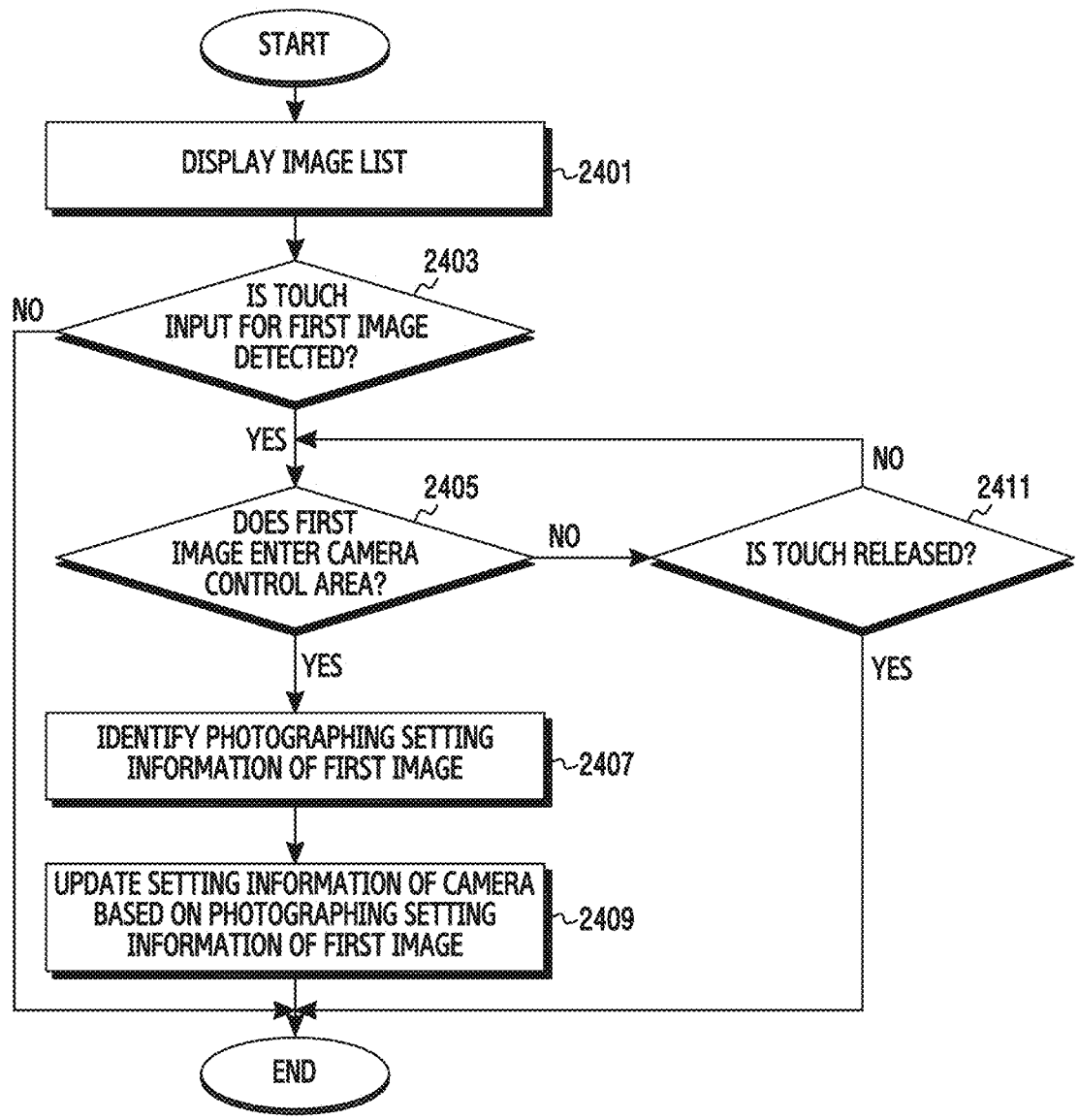
FIG. 24 is a flowchart of a process for controlling a camera device in accordance with photographing setting information of an image in an electronic device, according to an embodiment of the present disclosure.
Figure 25:
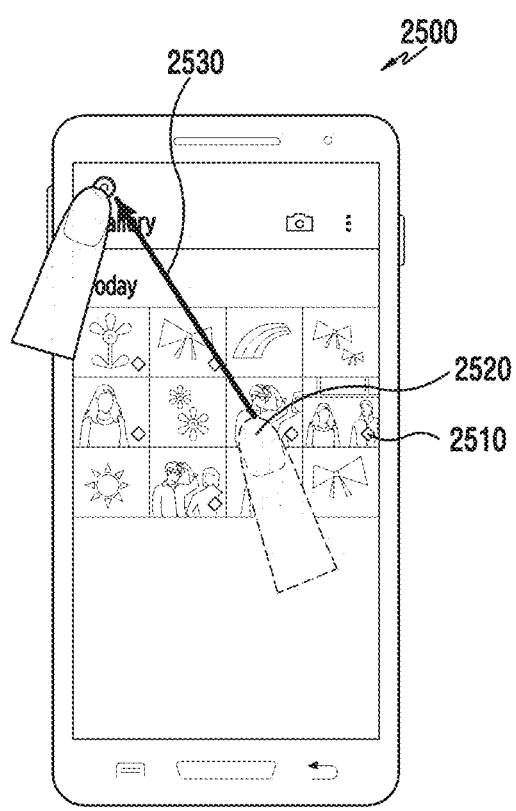
FIG. 25 illustrates a screen configuration for controlling a camera device in accordance with photographing setting information of an image in an electronic device, according to an embodiment of the present disclosure.

FIG. 24 is a flowchart of a process for controlling a camera device in accordance with photographing setting information of an image in an electronic device, according to an embodiment of the present disclosure. FIG. 25 illustrates a screen configuration for controlling a camera device in accordance with photographing setting information of an image in an electronic device, according to an embodiment of the present disclosure. In the following description, the electronic device may include the electronic device 201 or at least a part (for example, processor 230) of the electronic device 201.

Referring to FIG. 24, an operation for controlling the camera device using the screen configuration of FIG. 25 will be described. The electronic device 201 displays a list of at least one image stored in the memory 240 of the electronic device 201 on the display 270 in operation 2401. For example, referring to FIG. 25, when a gallery application is executed based on a user input, the processor 230 displays a thumbnail for at least one image stored in the memory 240 on the display 270 as indicated by reference numeral 2500. In addition, the processor 230 displays corresponding filter information 2510 on an image to which a filter for an image effect is applied. The electronic device 201 determines whether a touch input for a first image in an image list displayed on the display 270 is detected in operation 2403. For example, the processor 230 determines whether a touch input 2520 for the first image in the image list 2500 displayed on the display 270 is detected, as illustrated in FIG. 25.

When the touch input for at least one image in the image list is not detected, the electronic device 201 determines to not provide the camera service and terminates the operation for providing the camera service.

When the touch input for the first image in the image list is detected, the electronic device 201 determines whether the first image enters the camera control area in operation 2405. For example, the processor 230 determines whether the first image enters the camera control area through a drag input 2530 for the first image, as illustrated in FIG. 25. For example, when the touch input for the first image is released within the camera control area, the processor 230 determines that the first image enters the camera control area. For example, after detecting the first touch input 2520 for selecting the first image, the processor 230 determines whether a second touch input for determining a movement location of the first image is detected within the camera control area, as illustrated in FIG. 25.

When the first image does not enter the camera control area, the electronic device 201 determines whether the touch input for the first image is released in operation 2411. For example, the processor 230 determines whether the touch input 2520 for the first image is released outside the camera control area in FIG. 25.

When the touch input for the image is maintained, the electronic device 201 determines whether the first image enters the camera control area again by the touch input in operation 2405.

When the touch input for the first image is released, the electronic device 201 determines to not provide the camera service and terminates the operation for providing the camera service. For example, the processor 230 changes a location of the first image to a location where the touch input for the first image is released.

When the first image enters the camera control area, the electronic device 201 determines setting information of the camera device 220 set to capture the first image in operation 2407. For example, the setting information of the camera device 220 may include at least one of a filter for capturing the first image, image filter information, a photographing mode, and a photographing setting value (for example, aperture, shutter speed, and image size).

The electronic device 201 may update the setting information of the camera device 220 based on the setting information of the camera device 220 set to capture the first image in operation 2409. For example, the processor 230 may perform initial settings on the camera device 220 in accordance with the setting information of the camera device 220 that has been set to capture the first image.

Figure 26:
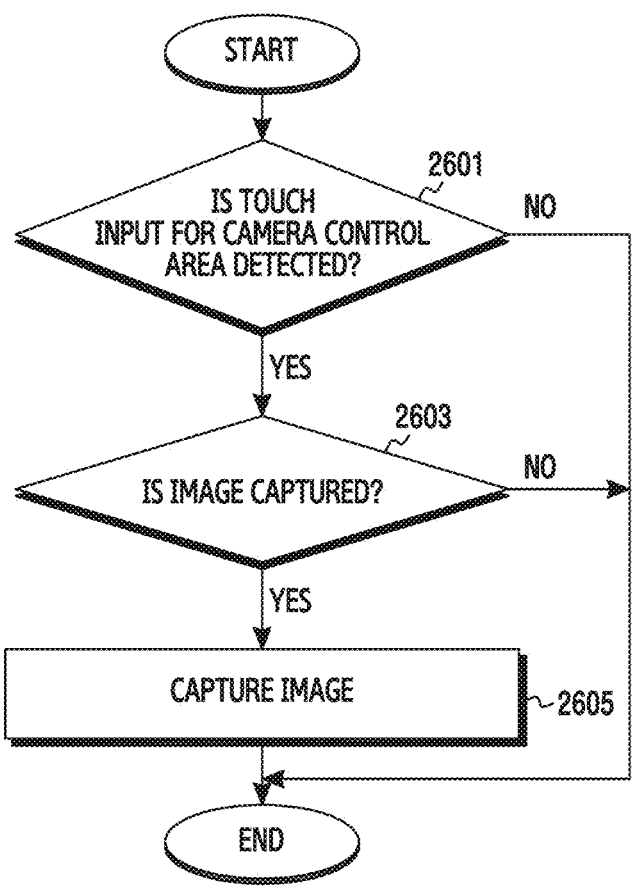
FIG. 26 is a flowchart of a process for capturing an image based on touch information of a camera control area in an electronic device, according to an embodiment of the present disclosure.

FIG. 26 is a flowchart of a process for capturing an image based on touch information of a camera control area in an electronic device, according to an embodiment of the present disclosure. In the following description, the electronic device may include the electronic device 201 or at least a part (for example, processor 230) of the electronic device 201.

Referring to FIG. 26, the electronic device 201 determines whether a touch input is detected through a camera control area set based on the placement area of the camera device 220 on the touch screen in operation 2601.

When the touch input is detected through the camera control area, the electronic device 201 determines whether image capturing matches the touch input detected through camera control area in operation 2603. For example, the processor 230 determines whether a double tap input which an image capturing event matches is detected based on touch input matching information stored in the memory 240.

When the touch input is not detected through the camera control area or when the image capturing does not match the touch input detected through the camera control area, the electronic device 201 determines to not perform the image capturing. Accordingly, the electronic device 201 terminates the operation for the image capturing.

When the image capturing matches the touch input detected through camera control area, the electronic device 201 captures the image through the camera device 220 without executing the camera application in operation 2605. For example, when the double tap input is detected through the camera control area, the processor 230 captures the image through the camera device 220 (for example, back camera device) in a state where the service screen of the application displayed on the display 270 is maintained. That is, the processor 230 captures the image in a state where a preview image acquired through the camera device 220 is not displayed. The processor 230 stores the captured image in the memory 240. In addition, the processor 230 displays image capturing information on a notification bar.

Figure 27:
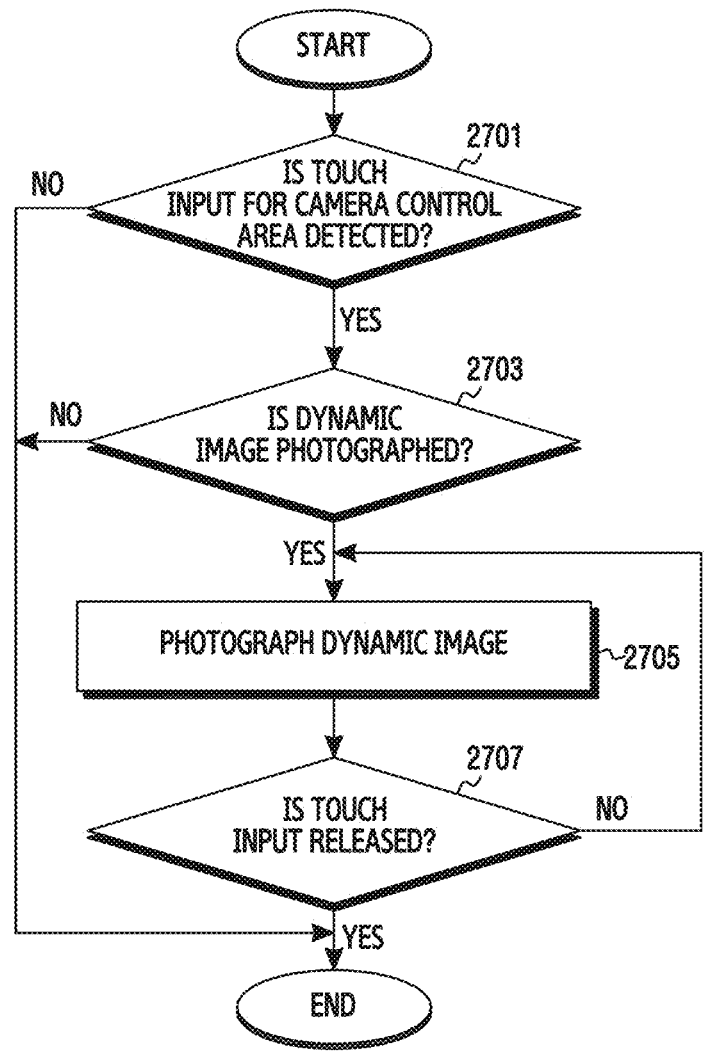
FIG. 27 is a flowchart of a process in which an electronic device photographs video based on touch information of a camera control area in an electronic device, according to an embodiment of the present disclosure.

FIG. 27 is a flowchart of a process for photographing video based on touch information of a camera control area in an electronic device, according to an embodiment of the present disclosure. In the following description, the electronic device may include the electronic device 201 or at least a part (for example, processor 230) of the electronic device 201.

Referring to FIG. 27, the electronic device 201 determines whether a touch input is detected through a camera control area preset to control the camera device 220 on the touch screen in operation 2701. The camera control area may include at least some areas of the touch screen including the placement area of the camera device 220. The camera control area may include at least some areas of the touch screen adjacent to the placement area of the camera device 220.

When the touch input is detected through the camera control area, the electronic device 201 determines whether video photographing matches the touch input detected through the camera control area in operation 2703. For example, the processor 230 determines whether a touch input having a touch maintaining time exceeding a reference time is detected through the camera control area based on touch input matching information stored in the memory 240.

When the touch input is not detected through the camera control area or when video photographing does not match the touch input detected through the camera control area, the electronic device 201 determines to not perform the video photographing. Accordingly, the electronic device 201 terminates the operation for the video photographing.

When the video photographing matches the touch input detected through the camera control area, the electronic device 201 starts the video photographing through the camera device 220 without executing the camera application in operation 2705. The processor 230 photographs the video through the camera device 220 (for example, back camera device) in a state where the service screen of the application displayed on the display 270 is maintained from a time point when the touch maintaining time of the touch input detected through the camera control area exceeds the reference time. When the video photographing is started, the processor 230 outputs notification information to allow the user to recognize the video photographing operation. Here, the notification information may include at least one of a notification sound, a notification message, and a vibration.

The electronic device 201 determines whether the touch input that the video photographing matches is released in operation 2707.

When the touch input that the video photographing matches is maintained, the electronic device 201 may continuously photograph the video in operation 2705.

When the touch input that the video photographing matches is released, the electronic device 201 terminates the video photographing. For example, the processor 230 may store the video photographed through the back camera device in the memory 240. In addition, the processor 230 displays video photographing information on the notification bar.

Figure 28:
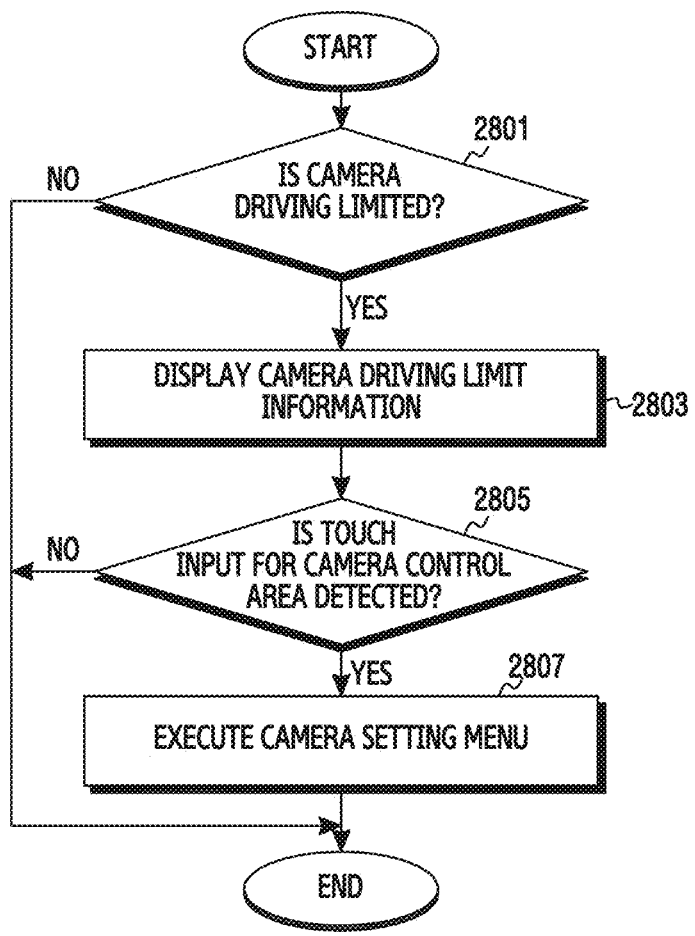
FIG. 28 is a flowchart of a process for displaying camera driving limit information in an electronic device, according to an embodiment of the present disclosure.
Figure 29:
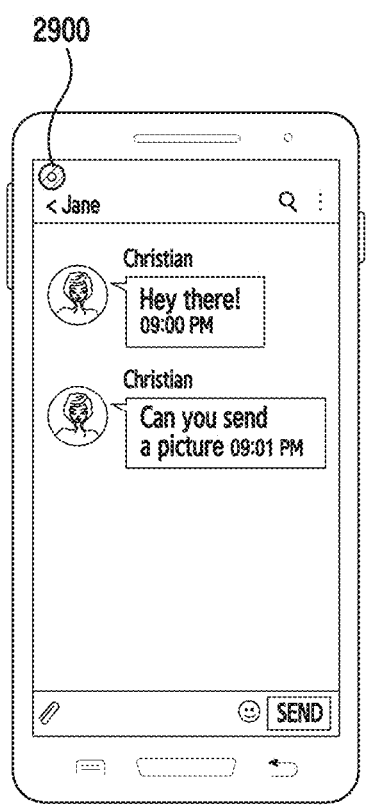
FIG. 29 illustrates a screen configuration for displaying camera driving limit information in an electronic device, according to an embodiment of the present disclosure.

FIG. 28 is a flowchart of a process for displaying camera driving limit information in an electronic device, according to an embodiment of the present disclosure. FIG. 29 illustrates a screen configuration for displaying camera driving limit information in an electronic device, according to an embodiment of the present disclosure. In the following description, the electronic device may include the electronic device 201 or at least a part (for example, processor 230) of the electronic device 201.

Referring to FIG. 28, an operation for displaying the camera driving limit information using the screen configuration of FIG. 29 will be described. The electronic device 201 determines whether driving of a camera device 220 is limited in 220 2801. For example, the processor 230 may identify whether the driving of the camera device 220 is limited based on the type of an application being executed in the electronic device 201. As another example, the processor 230 may identify whether the driving of the camera device 220 is limited based on a location of the electronic device 201. For example, the processor 230 determines whether an operation mode of the camera device 220 is set as an inactive mode based on input information detected through the input/output interface 260.

When the driving of the camera device 220 is not limited, the electronic device 201 terminates the operation for displaying the camera driving limit information.

When the driving of the camera device 220 is limited, the electronic device 201 displays camera driving limit information in the camera control area in operation 2803. Referring to FIG. 29, the processor 230 displays camera driving limit information 2900 (for example, red colored concentric circles) based on the placement area of the camera device 220.

The electronic device 201 determines whether a touch input is detected through the camera control area in a state where driving the camera device is limited in operation 2805. For example, the processor 230 determines whether a touch input for the camera driving limit information 2900 displayed in the camera control area is detected, as illustrated in FIG. 29.

When the touch input is detected through the camera control area in a state where the driving of the camera device 220 is limited, the electronic device 201 executes a camera setting menu in operation 2807. For example, when a tap input for the camera driving limit information 2900 is detected, the processor 230 displays a camera setting menu for resetting a right of the camera device 220 on the display 270.

Figure 30:
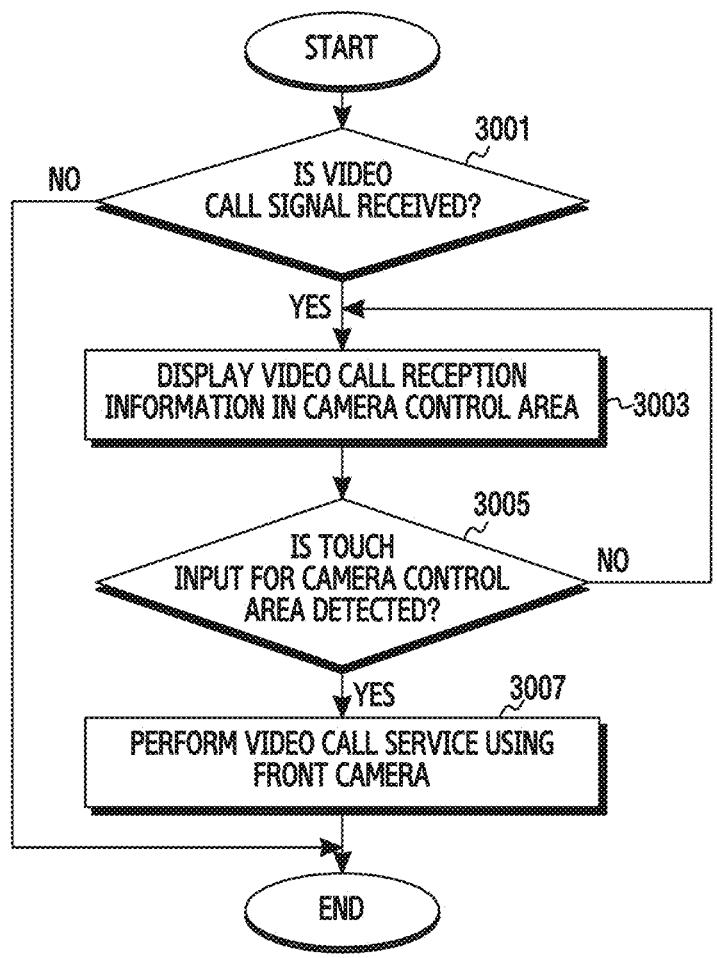
FIG. 30 is a flowchart of a process for providing a video call service in an electronic device, according to an embodiment of the present disclosure.
Figure 31:
FIG. 31 illustrates a screen configuration for providing a video call service in an electronic device, according to an embodiment of the present disclosure.

FIG. 30 is a flowchart of a process for providing a video call service in an electronic device, according to an embodiment of the present disclosure, FIG. 31 illustrates a screen configuration for providing a video call service in an electronic device, according to an embodiment of the present disclosure. In the following description, the electronic device may include the electronic device 201 or at least a part (for example, processor 230) of the electronic device 201.

Referring to FIG. 30, an operation for providing the video call service using the screen configuration of FIG. 31 will be described. Referring to FIG. 30, the electronic device 201 determines whether a call connection request signal for the video call is received in operation 3001. For example, when the call connection request signal is received through the communication interface 280, the processor 230 determines whether the corresponding call connection request signal is a call connection request signal corresponding to the video call service.

When the call connection request signal for the video call is not received, the electronic device 201 terminates the operation for providing the video call service.

When the call connection request signal for the video call is received, the electronic device 201 displays video call reception information of the display area corresponding to the camera control area in operation 3003. For example, referring to FIG. 31, the processor 230 displays video call reception information 3100 to be output from the placement area of the camera device 220 on the display 270.

In operation 3005, the electronic device 201 determines whether a touch input is detected through the camera control area in a state where the video call reception information is displayed. For example, the processor 230 determines whether a drag input in a first direction (for example, right direction) for the video call reception information 3100 displayed to be adjacent to the placement area of the camera device 220 is detected.

When the touch input is not detected through the camera control area, the electronic device 220 may maintain display of the video call reception information in at least some area of the display 270 corresponding to the camera control area in operation 3003 When the touch input is not detected through the camera control area until a reference time passes from a time point when the call connection request signal for the video call is received, the electronic device 201 may determine to not accept the video call connection. In this case, the electronic device 201 displays video call connection failure information on the display 270.

When the touch input is detected through the camera control area in a state where the video call reception information is displayed, the electronic device 201 activates the front camera device and provides the video call service in operation 3007. For example, when a drag input in a first direction (for example, right direction) for the video call reception information 3100 displayed in at least some areas of the display 270 is detected, the processor 230 determines that the user accepts the call connection for the video call. Accordingly, the processor 230 displays an image collected through the front camera device and an image received from a counterpart electronic device on the display 270 by executing the video call application.

When a drag input in a second direction (for example, left direction) for the video call reception information 3100 displayed in at least some areas of the display 270 is detected, the processor 230 may determine that the user does not accept the call connection for the video call. Accordingly, the processor 230 may block the call connection for the video call.

Figure 32:
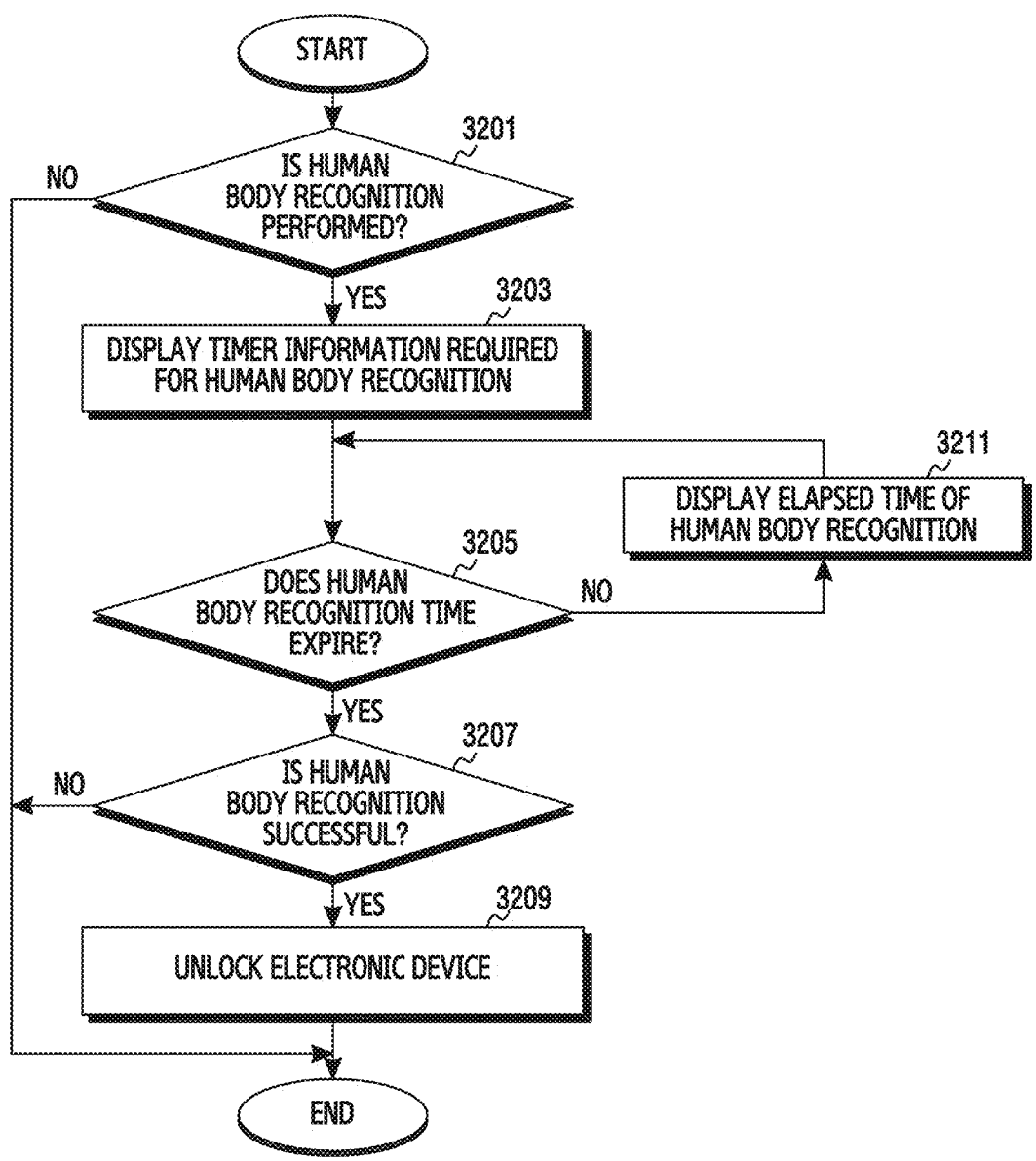
FIG. 32 is a flowchart of a process for displaying human body recognition service information in an electronic device, according to an embodiment of the present disclosure.

FIG. 32 is a flowchart of a process for displaying human body recognition service information in an electronic device, according to an embodiment of the present disclosure. FIGS. 33A to 33D illustrate a screen configuration for displaying human body recognition service information in an electronic device, according to an embodiment of the present disclosure. In the following description, the electronic device may include the electronic device 201 or at least a part (for example, processor 230) of the electronic device 201.

Referring to FIG. 32, an operation for providing the human body recognition service using the screen configuration of FIGS. 33A to 33D will be described. The electronic device 201 determines whether human body recognition is performed through the camera device 220 of the electronic device 201 in operation 3201. The processor 230 may determine whether an iris recognition menu for unlocking the electronic device 201 is selected using the camera device 220 (for example, front camera device). As another example, the processor 230 may determine whether a face recognition menu for authenticating the user of the electronic device 201 is selected using the camera device 220 (for example, front camera device).

When the human body recognition using the camera device 220 is not performed, the electronic device 201 terminates the operation for providing the human body recognition service.

Figure 33D:
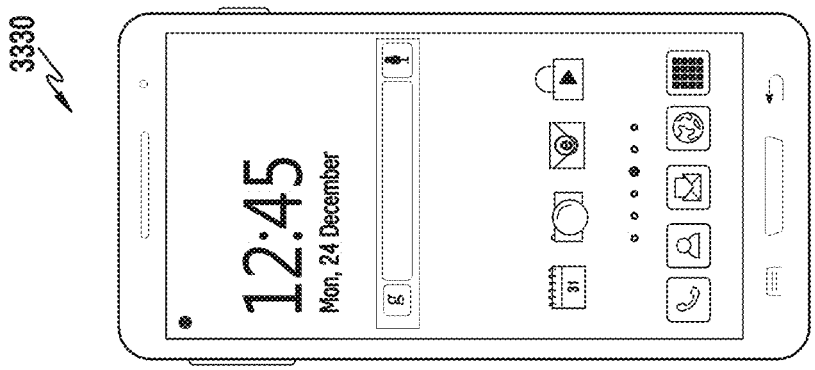
FIGS. 33A to 33D illustrate a screen configuration for displaying human body recognition service information in an electronic device according to an embodiment of the present disclosure.
Figure 33C:
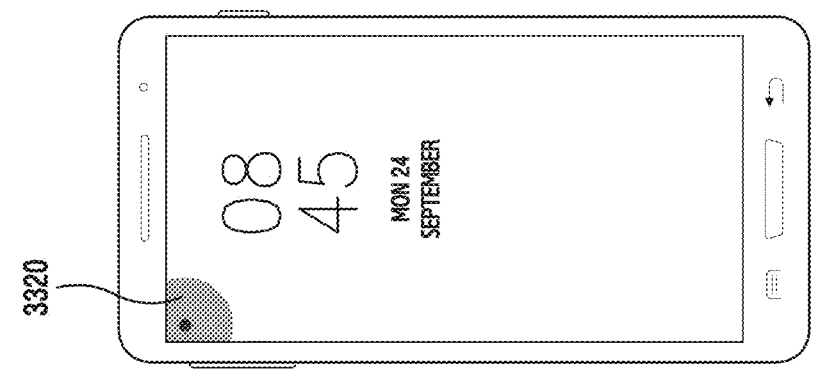
Figure 33B:
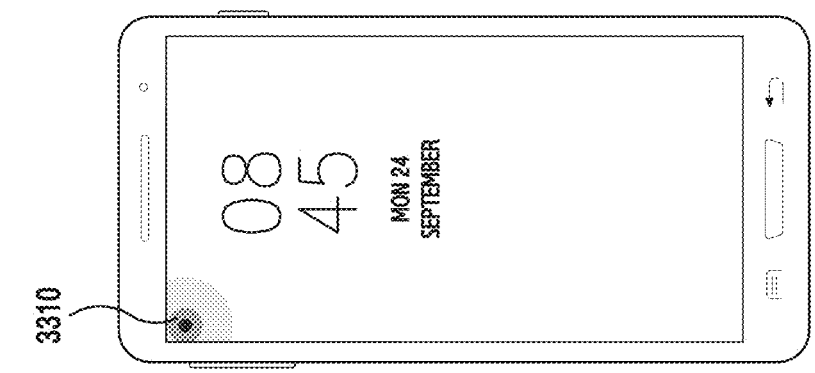
Figure 33A:
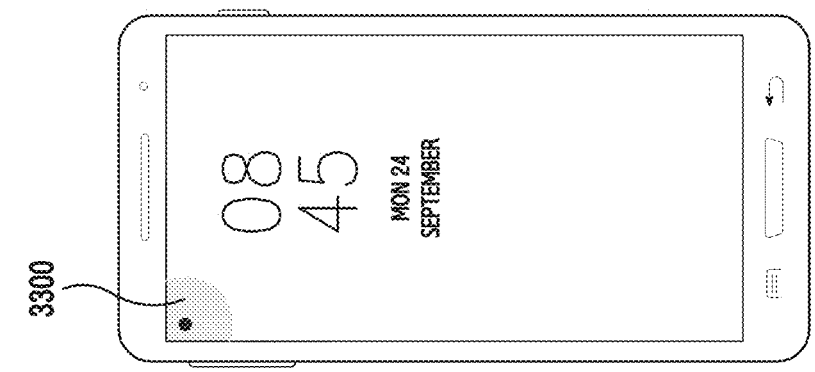

When the human body recognition using the camera device 220 is performed, the electronic device 201 displays time information spent for the human body recognition in a display area corresponding to the camera control area in operation 3203. Referring to FIG. 33A, when the iris recognition is performed, the processor 230 displays time information 3300 spent for the iris recognition based on the placement area of the camera device 220. The time spent for the human body recognition may include a minimum time during which the human body recognition (for example, iris recognition) can be completed through the camera device 220.

The electronic device 201 determines whether the time spent for the human body recognition expires in operation 3205. For example, the processor 230 determines whether an elapsed time from a time point when the human body recognition starts is the same as the time spent for the human body recognition.

When the time spent for the human body recognition does not expire, the electronic device 201 displays elapsed time information for the human body recognition in the display area corresponding to the camera control area in operation 3211. For example, referring to FIG. 33B, the processor 230 displays elapsed time information 3310 of the iris recognition to overlap the time information 3300 spent for the iris recognition displayed based on the placement area of the camera device 220.

The electronic device 201 determines again whether the time spent for the human body recognition expires in operation 3205.

When the time spent for the human body recognition expires, the electronic device 201 determines whether the human body recognition is successful in operation 3207. Referring to FIG. 33C, when the elapsed time of the performance of the iris recognition is the same as the time information spent for the iris recognition as indicated by reference numeral 3320, the processor 230 determines that the iris recognition is completed. Accordingly, the processor 230 determines whether the authentication of the user is successful based on a result of the iris recognition. For example, the processor 230 determines whether iris information detected through the iris recognition matches iris information preset in the memory 240.

When the human body recognition fails, the electronic device 201 determines that the authentication of the user through the human body recognition fails. Accordingly, the electronic device 201 terminates the operation for providing the human body recognition service. The electronic device 201 displays human body recognition failure information on the display 270.

When the human body recognition is successful, the electronic device 201 may unlock the electronic device 201 in operation 3209. Referring to FIG. 33D, when the user is authenticated through the iris recognition, the processor 230 releases a lock function of the electronic device 201 and displays a standby screen 3330 on the display 270.

Figure 34:
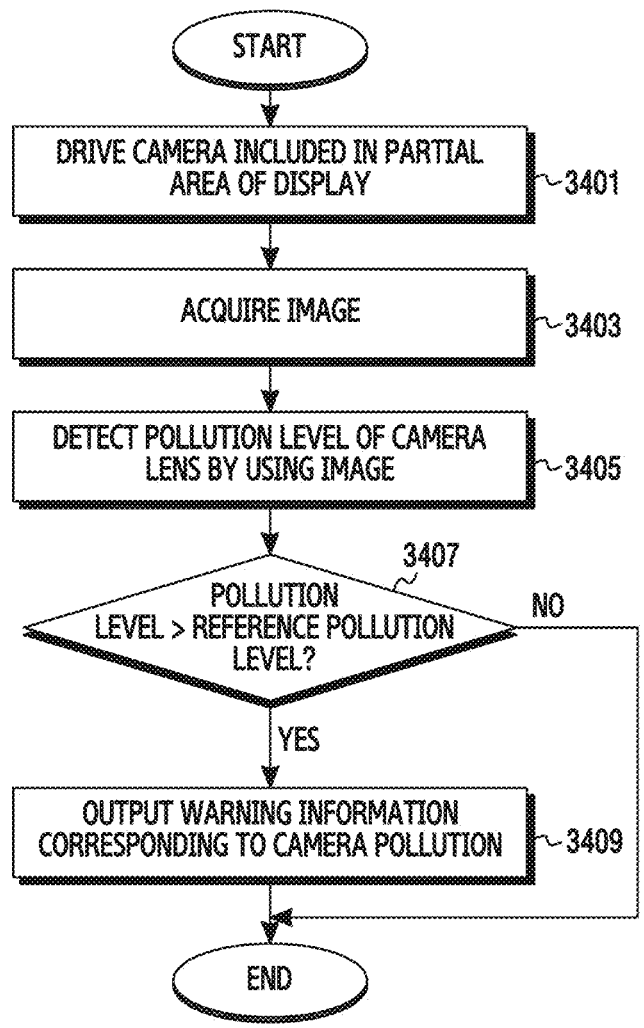
FIG. 34 is a flowchart of a process for displaying pollution level information of a camera device in an electronic device, according to an embodiment of the present disclosure.
Figure 35:
FIG. 35 illustrates a screen configuration for displaying pollution level information of a camera device in an electronic device, according to an embodiment of the present disclosure.

FIG. 34 is a flowchart, of a process for displaying pollution level information of a camera device in an electronic device, according to an embodiment of the present disclosure. FIG. 35 illustrates a screen configuration for displaying pollution level information of a camera device in an electronic device, according to an embodiment of the present disclosure. In the following description, the electronic device may include the electronic device 201 or at least a part (for example, processor 230) of the electronic device 201.

Referring to FIG. 34, an operation for displaying the pollution level information of the camera device 220 using the screen configuration of FIG. 35 will be described. The electronic device 201 drives the camera device 220 disposed on some areas (for example, upper area) of the display 270 in operation 3401. For example, the processor 230 executes the camera application based on touch information of a camera control area through operations 401 to 407 of FIG. 4 or operations 1001 to 1009 of FIG. 10. The processor 230 controls the camera device 220 (for example, front camera device) through the camera application.

The electronic device 201 captures an image through the camera device 220 disposed on some areas of the display 270 in operation 3403. For example, when a pollution level measuring event is generated, the processor 230 captures an image through the front camera device 120 disposed in the upper area of the display 270. For example, the pollution level measuring event may be periodically generated or may be generated at a time point when the camera device is driven.

The electronic device 201 may detect a pollution level of a camera lens through the image capture through the camera device 220 in operation 3405. For example, the processor 230 may estimate the definition of the image acquired through the front camera device. The processor 230 may detect the pollution level of the camera lens corresponding to the definition of the image.

The electronic device 220 determines whether the pollution level of the camera lens exceeds a reference pollution level in operation 3407. For example, the reference pollution level may be set, by the user, as a reference value of a pollution level which can influence a quality of the image acquired through the camera device 220 or may include a fixed value.

When the pollution level of the camera lens is less than or equal to the reference pollution level, the electronic device 201 determines that the pollution level of the camera lens does not influence the quality of the image acquired through the camera device 220. Accordingly, the electronic device 201 terminates the operation for displaying the pollution information of the camera lens.

When the pollution level of the camera lens exceeds the reference pollution level, the electronic device 201 displays pollution information of the camera lens in the display area corresponding to the camera control area to allow the user to recognize the pollution level of the camera lens in operation 3409. For example, when pollution level of the camera lens exceeds the reference pollution level, the processor 230 displays pollution information 3500 of the camera lens based on the placement area of the camera device 220 to inform the user to wash the camera lens.

The electronic device 201 may display an amount of the pollution level of the camera lens based on the placement area of the camera device 220. For example, the processor 230 may display the amount of the pollution level of the camera lens through the number of concentric circles based on the placement area of the camera device 220. For example, the processor 230 may increase the number of concentric circles displayed in the placement area of the camera device 220 as the pollution level of the camera lens is more serious. In addition, when the camera lens is not polluted, the processor 230 may not display the concentric circle indicating the pollution level of the camera lens.

An electronic device including a camera device disposed at a location overlapping at least a partial area of a display and an operation method thereof control the camera device based on an adjacent area including a placement area of the camera device or an adjacent area close to the placement area of the camera device, so that a user of the electronic device can easily drive and control a camera application.

An electronic device including a camera device disposed at a location overlapping at least a partial area of a display and an operation method thereof display control information related to a camera device in an adjacent area including a placement area of the camera device or an adjacent area close to the placement area of the camera device, so that a user of the electronic device can easily detect an operational state of the camera device and a natural photo can be taken by inducing user's eyes to a lens direction.

The term "module" as used herein may refer to a unit including one of hardware, software, and firmware or a combination of two or more of them. The term "module" may be interchangeably used with the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to an embodiment, at least some of the devices (for example, modules or functions thereof) or the method (for example, operations) may be implemented by instructions stored in a computer-readable storage medium in a program module form. The instructions, when executed by the processor 230, may cause the processor 230 to execute the function corresponding to the instruction. The computer-readable storage medium may be the memory 240.

The computer readable storage medium may include a hard disk, a floppy disk, magnetic media. (for example, a magnetic tape), optical media (for example, a compact disc read only memory (CD-ROM) and a digital versatile disc (DVD)), magneto-optical media (for example, a floptical disk), a hardware device (for example, a read only memory (ROM), a random access memory (RAM), a flash memory), and the like. In addition, the instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The embodiments disclosed herein are provided merely to easily describe technical details of the present disclosure and to help the understanding of the present disclosure, and are not intended to limit the scope of the present disclosure. Therefore, it should be construed that all modifications and changes or various other embodiments based on the technical idea of the present disclosure fall within the scope of the present disclosure. Therefore, the scope of the present disclosure is defined, not by the detailed description and embodiments, but by the appended claims and their equivalents.

What is claimed is:

1. An electronic device comprising:
   a touch screen including at least a first layer having a perforated hole formed in the first layer and a second layer having a region corresponding to the hole omitting pixels elements;
   a camera configured to capture an image through the hole; and
   at least one processor configured to:
      display an execution screen of an application,
      while the execution screen is displayed with a portion thereof completely surrounding the hole of the touch screen, receive, via the touch screen, a touch input on a portion of the touch screen, an initial contact area of the received touch input being over a portion of the execution screen surrounding at least a part of the hole,
      display a preview image received through the camera on the touch screen based on the touch input,
      wherein a portion of the preview image completely surrounds the hole of the touch screen,
      set a timer of the camera to capture the image based on a drag distance of the touch input from the portion of the touch screen, wherein time information of the timer is set to a time corresponding to the drag distance of the touch input,
      display, on the touch screen, a timer area including the time information of the timer, wherein a size of the timer area corresponds to the drag distance of the touch input,
      update the time information of the timer and decrease the size of the timer area according to an elapsing of the time,
      in response to determining that the time of the timer expires, capture the image using the camera, and
      display the captured image on the touch screen.

2. The electronic device of claim 1, wherein the at least one processor is further configured to display operational state information of the camera on the portion of the touch screen.

3. The electronic device of claim 1, wherein the touch input comprises a drag gesture that is initiated within the portion of the touch screen and is ended outside of the portion of the touch screen.

4. The electronic device of claim 3, wherein the at least one processor is further configured to display the preview image being received through the camera and having a size based on a position of the touch screen where the drag gesture is ended.

5. The electronic device of claim 1, wherein the at least one processor is further configured to:
   execute the camera in response to the received touch input,
   display activation information regarding the execution of the camera in the portion of the touch screen, and
   display the preview image received through the camera on the touch screen based on a drag of the touch input from a first position to a second position on the touch screen.

6. The electronic device of claim 1, wherein the at least one processor is further configured to display the preview image in a first portion of the touch screen and a screen of an application in a second portion of the touch screen distinct from the first portion.

7. The electronic device of claim 6, wherein the at least one processor is further configured to configure, when an image is captured through the camera, the captured image as input data of the application.

8. The electronic device of claim 1, wherein the at least one processor is further configured to change a color of the touch screen into a bright color based on the touch input simultaneously with capturing an image through the camera.

9. A method of operating an electronic device comprising a camera configured to capture an image through a perforated hole formed in a first layer of a touch screen including at least the first layer and a second layer having a region corresponding to the hole omitting pixels elements, the method comprising:
   displaying an execution screen of an application;
   while the execution screen is displayed with a portion thereof completely surrounding the hole of the touch screen, receiving, via the touch screen, a touch input on a portion of the touch screen, an initial contact area of the received touch input being over a portion of the execution screen surrounding at least a part of the hole;
   displaying a preview image received through the camera on the touch screen based on the touch input,
   wherein a portion of the preview image completely surrounds the hole of the touch screen;
   setting a timer of the camera to capture the image based on a drag distance of the touch input from the portion of the touch screen, wherein time information of the timer is set to a time corresponding to the drag distance of the touch input;
   displaying, on the touch screen, a timer area including the time information of the timer, wherein a size of the timer area corresponds to the drag distance of the touch input,
   updating the time information of the timer and decreasing the size of the timer area according to an elapsing of the time;
   in response to determining that the time of the timer expires, capturing the image using the camera; and
   displaying the captured image on the touch screen.

10. The method of claim 9, further comprising:
   displaying operational state information of the camera on the portion of the touch screen.

11. The method of claim 9, wherein the touch input comprises a drag gesture that is initiated within the portion of the touch screen and is ended outside of the portion of the touch screen.

12. The method of claim 11, wherein displaying the preview image further comprises:
 displaying the preview image being received through the camera and having a size based on a position of the touch screen where the drag gesture is ended.

13. The method of claim 9, further comprising:
 executing the camera in response to the received touch input; and
 displaying activation information regarding the execution of the camera in the portion of the touch screen.

14. The method of claim 13, wherein displaying the preview image comprises:
 displaying the preview image received through the camera on the touch screen based on a drag of the touch input from a first position to a second position on the touch screen.

15. The method of claim 9, wherein displaying the preview image comprises:
 displaying the preview image in a first portion of the touch screen and a screen of an application in a second portion of the touch screen distinct from the first portion.

16. The method of claim 15, further comprising;
 configuring, when an image is captured through the camera, the captured image as input data of the application.

17. The method of claim 9, further comprising;
 changing a color of the touch screen into a bright color based on the touch input simultaneously with capturing an image through the camera.

\* \* \* \* \*